United States Patent
Hillman

(10) Patent No.: US 11,630,819 B2
(45) Date of Patent: Apr. 18, 2023

(54) TECHNIQUES FOR CONTROLLING INTERACTION WITH AN APPLICATION DATABASE

(71) Applicant: Parametric Systems Pty Ltd, Kambah (AU)

(72) Inventor: Christopher John Hillman, Kambah (AU)

(73) Assignee: Parametric Systems Pty Ltd, Kambah (AU)

( * ) Notice: Subject to any disclaimer, the term of this patent is extended or adjusted under 35 U.S.C. 154(b) by 165 days.

(21) Appl. No.: 16/815,079

(22) Filed: Mar. 11, 2020

(65) Prior Publication Data
US 2020/0301909 A1 Sep. 24, 2020

(30) Foreign Application Priority Data
Mar. 20, 2019 (AU) .................................. 2019900923

(51) Int. Cl.
G06F 16/25 (2019.01)
G06F 8/30 (2018.01)
G06F 8/41 (2018.01)
G06F 16/23 (2019.01)

(52) U.S. Cl.
CPC ............ *G06F 16/2365* (2019.01); *G06F 8/30* (2013.01); *G06F 8/447* (2013.01); *G06F 16/252* (2019.01)

(58) Field of Classification Search
None
See application file for complete search history.

(56) References Cited

U.S. PATENT DOCUMENTS

| 8,448,130 | B1 * | 5/2013 | Pillarisetti | G06F 8/447 717/124 |
| 8,869,103 | B2 | 10/2014 | Conrad et al. | |
| 9,607,017 | B2 | 3/2017 | Debray et al. | |

(Continued)

*Primary Examiner* — Irene Baker
(74) *Attorney, Agent, or Firm* — Harness, Dickey & Pierce, P.L.C.

(57) ABSTRACT

A computer implemented method for the automated construction of a computer program for allowing an application program to interface with an application database based on instructions received via the application program, the method comprising: storing a set of predefined discrete program code statements that each perform a distinct function or part function for interfacing with the database, at least one of the statements in the statement set containing one or more placeholders in which specification details can be inserted; receiving process, information and database parameter specifications; and responsive to receiving the specifications, automatically evaluating the specifications and thereafter implementing predefined embedded logic that is driven by the evaluation to: i) select a plurality of discrete program code statements from the stored set; ii) edit the selected discrete program code statements, where applicable, to insert specifications into the placeholders; and iii) combine the selected discrete program code statements in an order dictated by predefined logic; and wherein at least some of the discrete program statements are executable for processing inputs from and/or supplying outputs to the application program, and others are combined and executable for maintaining database integrity.

16 Claims, 18 Drawing Sheets

(56) References Cited

U.S. PATENT DOCUMENTS

| | | | |
|---|---|---|---|
| 2003/0158760 A1* | 8/2003 | Kannenberg | G06Q 40/08 |
| | | | 717/140 |
| 2003/0233632 A1* | 12/2003 | Aigen | G06F 8/30 |
| | | | 717/106 |
| 2009/0031230 A1* | 1/2009 | Kesler | G06F 16/252 |
| | | | 715/764 |
| 2010/0023952 A1* | 1/2010 | Sandoval | G06F 21/6245 |
| | | | 707/E17.127 |
| 2011/0113054 A1* | 5/2011 | McLean | G06F 16/8358 |
| | | | 707/769 |
| 2014/0344210 A1* | 11/2014 | Leigh | G06F 16/254 |
| | | | 707/602 |

\* cited by examiner

Figure 11

| Functions | Action Function 4.8 | | Generated Code — Entity Access | |
|---|---|---|---|---|
| Add Process 1.3.2 | Add 4.8.1 | Verify 4.8.1.1 | Reset Table Element Array | 4.9 |
| | | | Access Table Element content | 4.8.4 |
| | | Action 4.8.1.2 | Add Table Element content | 4.24 |
| | | | Update Entity | 4.26 |
| Change Process 1.3.3 | Change 4.8.2 | Read 4.8.2.1 Existing Entity | Reset Table Element Array | 4.9 |
| | | | Access Table Element content | 4.8.4 |
| | | | Move Table Elements | 4.10 |
| | | Action 4.8.2.2 | Change Table Element content | 4.25 |
| | | | Update Entity | 4.26 |
| Remove Process 1.3.4 | Remove 4.8.3 | Action 4.8.3.1 | Remove Table Element content | 4.8.3 |
| Provide Information 1.4.1 | Provide 4.8.4 | Action 4.8.4.1 | Reset Table Element Array | 4.9 |
| | | | Access Table Element content | 4.8.4 |
| | | | Move Table Elements | 4.10 |

Figure 11

TECHNIQUES FOR CONTROLLING INTERACTION WITH AN APPLICATION DATABASE

FIELD OF THE INVENTION

The present invention relates generally to techniques for controlling interaction with an application database and more particularly to automated methods for creating that interaction while maintaining database integrity.

BACKGROUND OF THE INVENTION

Databases are the common storage for data recorded by a computer application. Unless care is taken with the database design, there can be future problems arising from the design of the database.

Years ago, it was found that entities including data that described properties of different objects contained in the same entity would create problems when maintaining, or retrieving, the data.

The solution proposed was normalisation of the database design. In general terms, database normalisation is the process of structuring a relational database in accordance with a series of so-called normal forms in order to reduce data redundancy and improve data integrity. Normalising the database involves applying formal rules when organising the columns (attributes) and tables (related attributes) and the relationships between tables in a database to ensure that their dependencies are properly enforced by database integrity constraints.

In addition to ensuring database integrity, normalisation also provides greater flexibility in the use of the database and protects against the consequences of unknown future changes to the tables or table attributes. Normalisation also increases the ability to provide information required by future changes. These were the generally claimed benefits of normalisation when it was first proposed.

However, there are several notable "costs" to database normalisation when done correctly. For example, normalisation necessarily requires that the number of entities in the database is increased. It also increases the complexity in the SQL statements needed to maintain table attribute content and for recovering information.

By way of example, consider an un-normalised entity called "person". The entity records details on both names and employment. But not all of the persons have employment. The application does not always expect to have details on employment. So, employment should be in a separate entity, used only when necessary. When normalised to do this, access to the database becomes more complex if employment has to be combined, at times, with person.

The consequence of this normalisation is that database tables proliferate. Getting information requires a greater understanding of the relationships between the multiple tables. Creation of SQL statements to operate with the database becomes harder. In short, what is likely to happen is that normalisation will be compromised so that the difficulty will be diminished. This leaves entities with blank columns of data where the column should not be in the entity in the first place.

Say, in the future, someone wants to record the starting date and the termination date of employment for a person. Normalisation says these should be together with other employment details in their own entity. Do we add the extra data into person thereby making it less normalised, or do we now normalise the database, add an employment entity, and change all the programs that used to look at person to get employment detail (with all the work that might entail), just because we took a short cut in the first place?

There is also the problem of conflict between what the user of a computer application wants to see (the "information") and the content in the database (the "data"). Data represents one thing and one thing only. A database can be constructed with an applicant entity holding applicant-name and an agent entity holding agent-name. But what happens if an agent also wants to be treated as an applicant? Normalisation would expect three entities to be in the database: an applicant-entity, an agent-entity and a names-entity all of which may be interconnected by other entities to reveal agent information, or reveal person information, or be able to reveal both, as appropriate.

Controlling these costs in turn requires increased expertise when the database is designed, maintained and interrogated for information, which becomes a problem due to a world-wide shortage of trained database design and SQL professionals.

Another problem relates to computer applications that use databases. Many programs exist in most applications and each will access the database as required by the program function. So, if the database design needs to be changed, so too do the programs. Implementing this change can be time consuming and carries a risk that not all changes will be coded successfully. Further, such changes are often made in a manner that minimises cost at the expense of good database design, in turn increasing the likelihood of other problems arising downstream.

It would be advantageous if there was provided a method for minimising the complexity and cost associated with ensuring database integrity. It would also be advantageous if there were provided techniques that made it irrelevant how many entities there should be to get proper normalisation.

SUMMARY OF THE INVENTION

In accordance with a first aspect of the invention there is provided a computer implemented method for the automated construction of a computer program for allowing an application program to interface with an application database based on instructions received via the application program, the method comprising: storing a set of predefined discrete program code statements that each perform a distinct function or part function for interfacing with the database, at least one of the statements in the statement set containing one or more placeholders in which specification details can be inserted; receiving process, information and database parameter specifications; and responsive to receiving the specifications, automatically evaluating the specifications and thereafter implementing predefined embedded logic that is driven by the evaluation to: i) select a plurality of discrete program code statements from the stored set; ii) edit the selected discrete program code statements, where applicable, to insert specifications into the placeholders; and iii) combine the selected discrete program code statements in an order dictated by predefined logic; and wherein at least some of the discrete program statements are executable for processing inputs from and/or supplying outputs to the application program, and others are combined and executable for maintaining database integrity.

In an embodiment the predefined discrete program code statements within the set include executable code for implementing a predefined suite of database application functionality.

In an embodiment the parameter specifications comprise at least one of the following: one or more inputs and/or outputs; one or more entities; and one or more table elements.

In an embodiment the predefined logic is programmed to consider relationships between the specifications when selecting the discrete program code statements.

In an embodiment the relationships are determined based on an evaluation of identifiers for the various specifications.

In an embodiment, prior to combining, each edited program code statement is stored in a data store in association with an order number and wherein the order number is subsequently evaluated for combining the selected program code statements into sequential order prior to compiling as computer program code.

In an embodiment the constructed computer program allows for at least one of the following actions to be taken while ensuring that database integrity is maintained:
  a. addition of new information into the database;
  b. alteration of existing information in the database;
  c. removal of information from the database;
  d. provision of information contained in the database, where the provided information can be used to validate an action intended to be taken;
  e. provision of information contained in the database, where the provided information can be used to create collections of related information.

In an embodiment information for validation of any intended action is provided in response to a request for information with a specification defining the information from the database that is necessary for that validation.

In an embodiment actions to be taken on the database are taken in response to addition, alteration or removal specifications defining the content on the database to be affected by the action.

In an embodiment information for a collection is provided in response to a request for information with a specification defining the source of the information and a specification defining the information required in the collection.

In an embodiment, the method further comprising repeating steps (i) to (iii) to regenerate the computer program code in response to receiving revised specifications from an authorised user.

In accordance with a second aspect there is provided non-transitory computer readable medium storing computer program code comprising at least one instruction that, when executed by a computer system, is operable to implement the method in accordance with any one of the preceding claims.

BRIEF DESCRIPTION OF THE DRAWINGS

Features and advantages of the present invention will become apparent from the following description of embodiments thereof, by way of example only, with reference to the accompanying drawings, in which:

FIGS. 3 to 18 schematically depict various operations carried out by various modules and sub modules of the computer program code generator of FIG. 1.

DETAILED DESCRIPTION OF PREFERRED EMBODIMENTS

Figure 1:
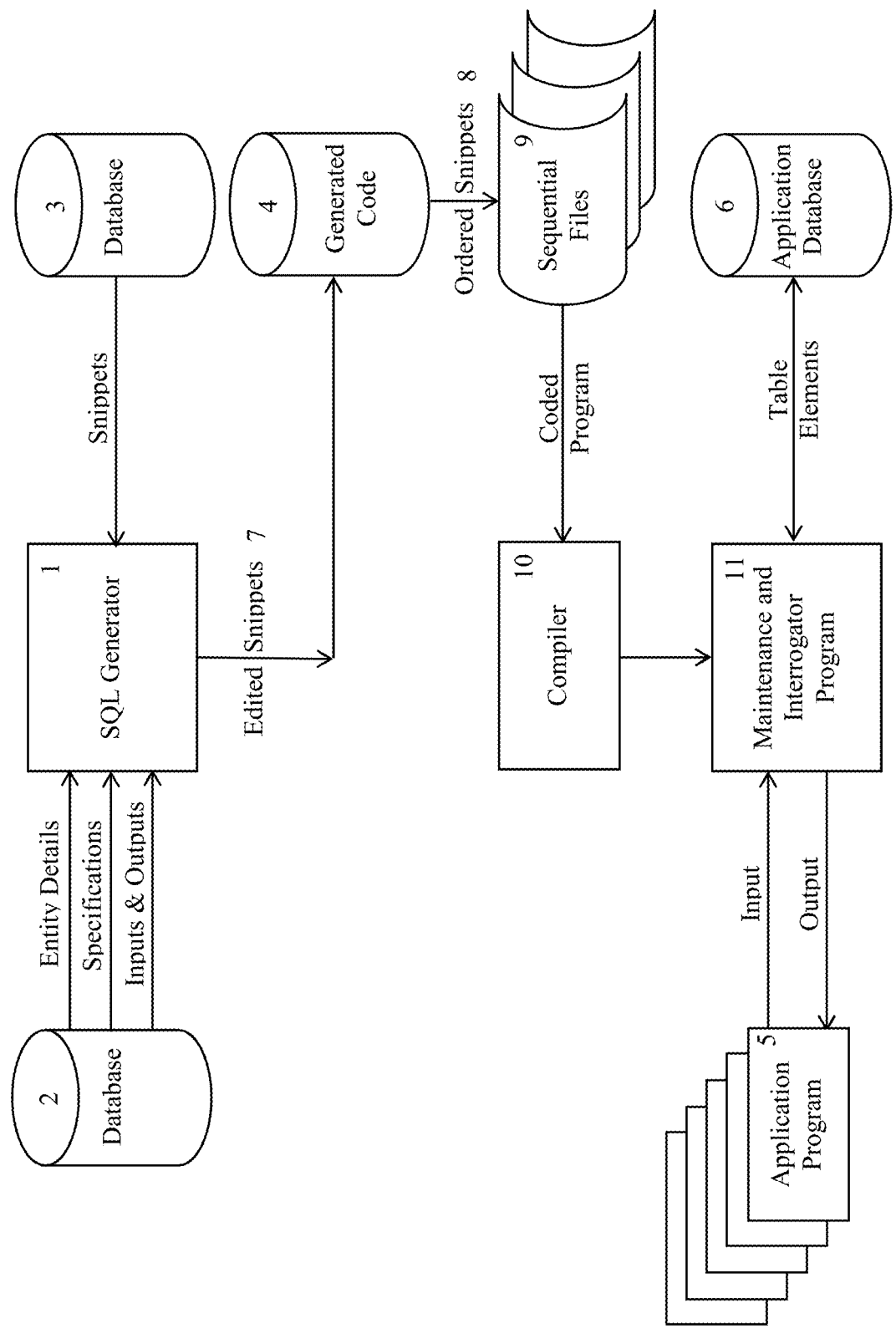
FIG. 1 is a schematic illustrating operation of a computer program code generator, in accordance with an embodiment of the invention.

Embodiments described herein are related to techniques for the automated construction of a computer program that allows an application program to interface with an application database. Predefined logic is used to generate the computer program from database, process and information parameter specifications and is configured in such a way as to ensure that the integrity of the database is maintained based on any instruction received via the application. The computer program may advantageously be dynamically regenerated based on revised parameter specifications (i.e. obviating the need for manually updating every impacted part of the application).

As will become evident from subsequent paragraphs, embodiments advantageously minimise the complexity overhead created as a result of proper database normalisation (i.e. for maintaining database integrity) and thus remove the trade-offs between good practice and pragmatism.

In any definitive text there is a risk that common terms like data and tables can become very confusing especially when discussing a computer program which will have input data and output data and database data and tables in a database and tables held within the program. In an attempt to alleviate any confusion, the following definitions will be applied throughout this application:

Data—
A property of something: e.g. a date, or a number, or a text
Application Input—
A process function PLUS process name PLUS process elements
Process Function—
The type of process required: e.g. Add data to a database
Process Name—
An identifier for this specific application input
Process Elements—
A collection of data that is aggregated together: e.g. a form or a section of a form
Application Output—
An information function PLUS information name PLUS information elements
Information Function—
The type of Information being Output
Information Name—
An identifier for this specific output
Information Elements—
An aggregated collection of data requested to be output
Information—
A collection of data that describes something
Database—
A collection of entities
Entity—
A normalised database table being—
a collection of table elements where no table element repeats within the entity and table elements in an entity comprise an entity record
Entity Record—
A collection of related table elements
Table Element—
An element that describes a property of the entity
Recordset—
An entity record, or records read from a database
Recordset Element—
A table element located within a recordset
Primary Key—
A table element being—
an identifier to make an entity record unique within an entity, or to be part of a collection of table elements that make an entity record unique within an entity, and which is/are allowed to be present in more than one entity Record Orphan Element—

A process or information element that has not been specified as a table element

Snippet—

Discrete section of program code

Specifications—

Details that define the properties of a process element, information element, table element or entity as appropriate SQL Statement—

A coded instruction conforming to the Structured Query Language (SQL) syntax used to control or access the content of a database With reference to FIG. 1 there is shown a schematic of a computer program generator (1) in accordance with an embodiment of the invention. The computer program generator (1) is communicable with a compiler (10) for generating the computer program (11) that is the subject of the invention. The computer program code (11) is configured to interface with an application database (6). The program code (11) is dynamically generated from code that enforces database integrity while performing any instruction received via one or more application programs (5).

More particularly, the computer program generator (1) is configured to automatically generate the computer program (11) utilising discrete predefined program language (VB6) and SQL program code sections (hereafter "snippets") and thus will hereafter be referred to as an SQL generator (1). Further, given the function of the computer program (11), it will hereafter be referred to as the maintenance and interrogator program (11).

As will be described in more detail in subsequent paragraphs, the SQL generator (1), driven by predefined logic and based on user specified process, information and database parameter specifications, retrieves selected snippets stored in a snippet database (3) to provide the skeleton for the generated program code (4). Many of the snippets stored in the database (3) contain placeholders into which properties of the specifications can be inserted, as required, to make the snippet a complete portion of code. Again, as will become evident from subsequent paragraphs, many snippets need to be combined in sequence to create the completed process and SQL statements required for the maintenance and interrogator program (11) to maintain and interrogate the database (6). Other snippets are combined to construct the required program code for the maintenance and interrogator program (11) to execute the SQL statements as required by application program inputs and to construct requested outputs. The SQL generator (1) may advantageously regenerate the program (11) in response to receiving revised specifications from an authorised user.

Throughout the following description of the invention the words generated, generation and generate all refer to the process of snippet selection and the consequent insertion of detail to replace the placeholders hereafter referred to as "editing" the snippet.

According to the illustrated embodiment, the following information is supplied to the SQL generator (1) for constructing the generated program code (4):

For Inputs—
Process name
Process type
Process elements
For Outputs—
Information name
Information type
Information elements
For Process, Information and Table Elements—
Element name—used to relate an element between the types
Format—e.g. string, or numeric, etc.—used to select the correct format snippet and to control primary key element creation
For Entities—
Entity name
Entity type—Link entity or Detail entity
Table elements included in the entity
For Table Elements—
Table elements that are primary key elements
Table elements that can have a value assigned by the maintenance and interrogator program (11)
Default value of the table element The SQL generator (1) may utilise hundreds of snippets that give access to many thousands of lines of skeleton code, depending on the parameter specifications. More particularly, the SQL Generator (1) takes the specifications of the entities, elements, inputs, and outputs and transforms them into a single maintenance and interrogator program (11) designed to process all the actions required for an application database (6) for the whole of a computer application about which the SQL Generator (1) knows nothing until the specifications are analysed by the SQL generator (1).

It will be understood that the snippet set will typically contain many hundreds of snippets that allow the SQL generator (1) to construct the generated code (4) to suit whatever entities, elements, inputs, outputs and specifications that are supplied. According to the illustrated embodiment, the format of each snippet is unique to the SQL generator (1) and each has been constructed specifically for use by the SQL Generator (1). It will be understood that the actual content of the snippets can vary and thus the invention should not be seen as being limited to the specific snippet content. Nor are specific details of the changes edited into the snippets a part of the invention. The invention only requires that editing occurs to snippets relevant to the generated code (4) to be constructed for the maintenance and interrogator program (11).

Edited snippets (7) are snippets from the database (3) which have been altered to reflect the entities, table elements, specifications and inputs and outputs received by the SQL generator (1). They are randomly stored in the generated code data store (4) and each edited snippet (7) includes an ordering number system to allow later extraction as ordered snippets (8) into the sequential files (9). The ordered snippets (8) are ordered by the extraction to process the input and output requirements and to access the entities required to satisfy those requirements as the maintenance and interrogator program (11).

After generation is complete, the generated code (4) is extracted and placed into sequential files (9) suitable for input into a compiler (10). The compiler (10) creates the maintenance and interrogator program (11) used to process inputs from, and supply outputs to, the application program(s) (5).

Details of the table elements are supplied by the entity detail from the database (2) and their origin is not specified since the invention concerns the use of the details, not the origin.

The databases (2), (3) and (4) are shown separately for clarity. They could be combined in one database without adverse effect on the invention.

Both the SQL generator (1) and the maintenance and interrogator program (11) are normal computer programs. They each have an internal structure that reflects the use of the program. Thus, the SQL generator (1) contains a structure that processes parts of the generation as discrete components. However, the maintenance and interrogator program (11) is generated such that for every input received from an application program (5) it must provide an output to the application program (5). Two very different structures that are reconciled by the invention through the use of the ordered numbering system.

Edited Snippets

Figure 2:
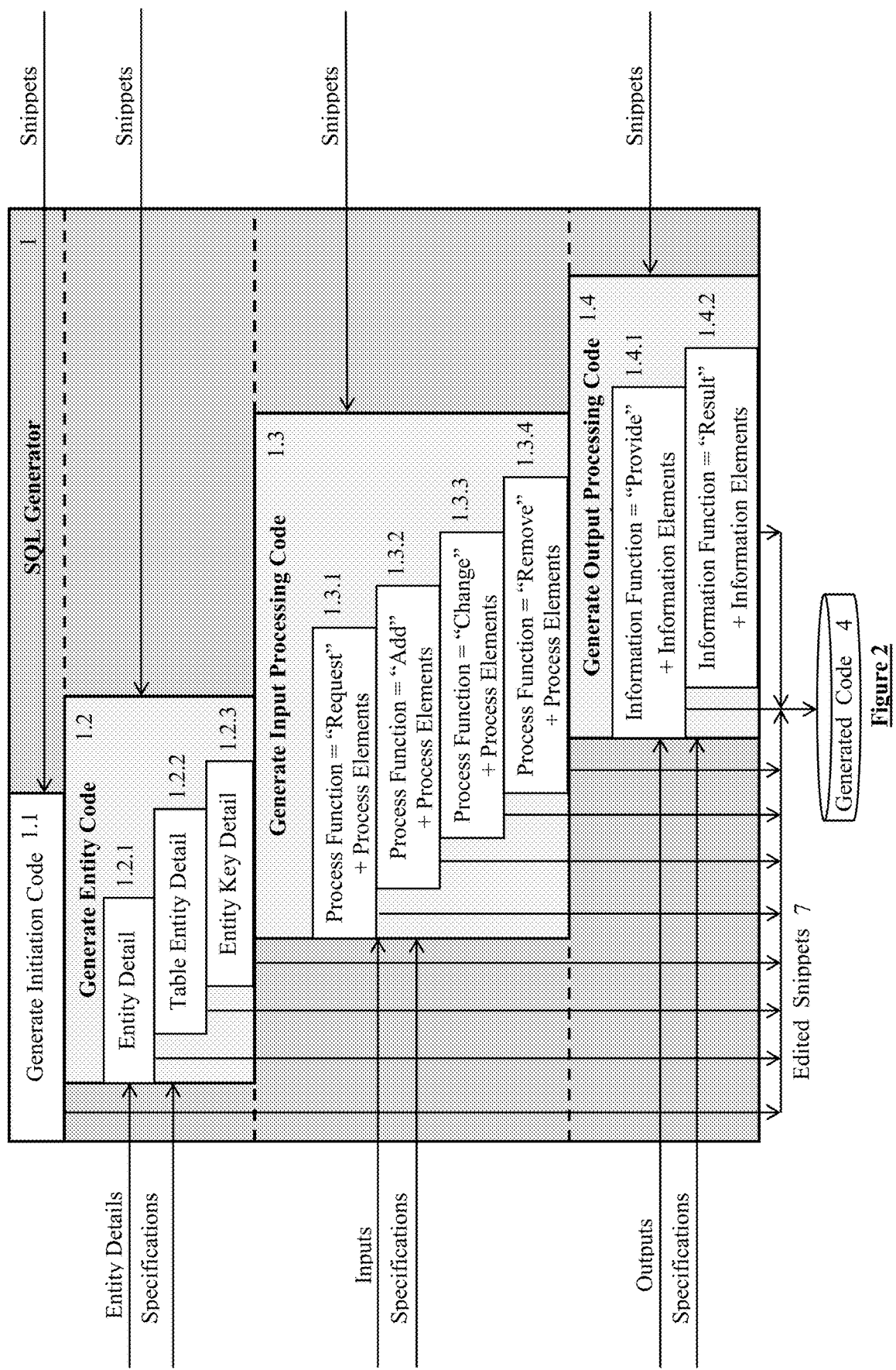
FIG. 2 is a schematic of the internal components of the computer program code generator of FIG. 1.

FIG. 2 shows the components in the SQL generator (1), each of which create edited snippets (7) to construct the generated code (4). These edited snippets (7) are produced in an order that reflects the structure within the SQL generator (1) NOT the structure within the maintenance and interrogator program (11).

According to the illustrated embodiment, each edited snippet (7) references two numbers that allow them to be placed into an order suitable for the generated code (4) to be retrieved and then stored into the sequential files (9). These numbers are a section number and a line number and they are specified for every snippet. The line number is fixed within each snippet, starts from 1, and increments by 1. The section number is variable.

There is an initial section number value recorded with each snippet. There are also three level values recorded with each snippet. As the SQL generator (1) processes, it maintains counters of various occurrences.

For Example: As details of the entities are processed there is a count to show which entity is currently being processed. This count is used to increase the section number for this occurrence of an edited snippet (7) by the count multiplied by a level value. Similarly, as table elements are processed for an entity, a count is maintained showing the table element within the entity currently being processed. This count can be used to further increase the section number for the snippet that reflects the entity, by the table element count multiplied by a level value thereby having the section number reflect both the occurrence of the entity and the occurrence of the element in the entity.

Figure 18:
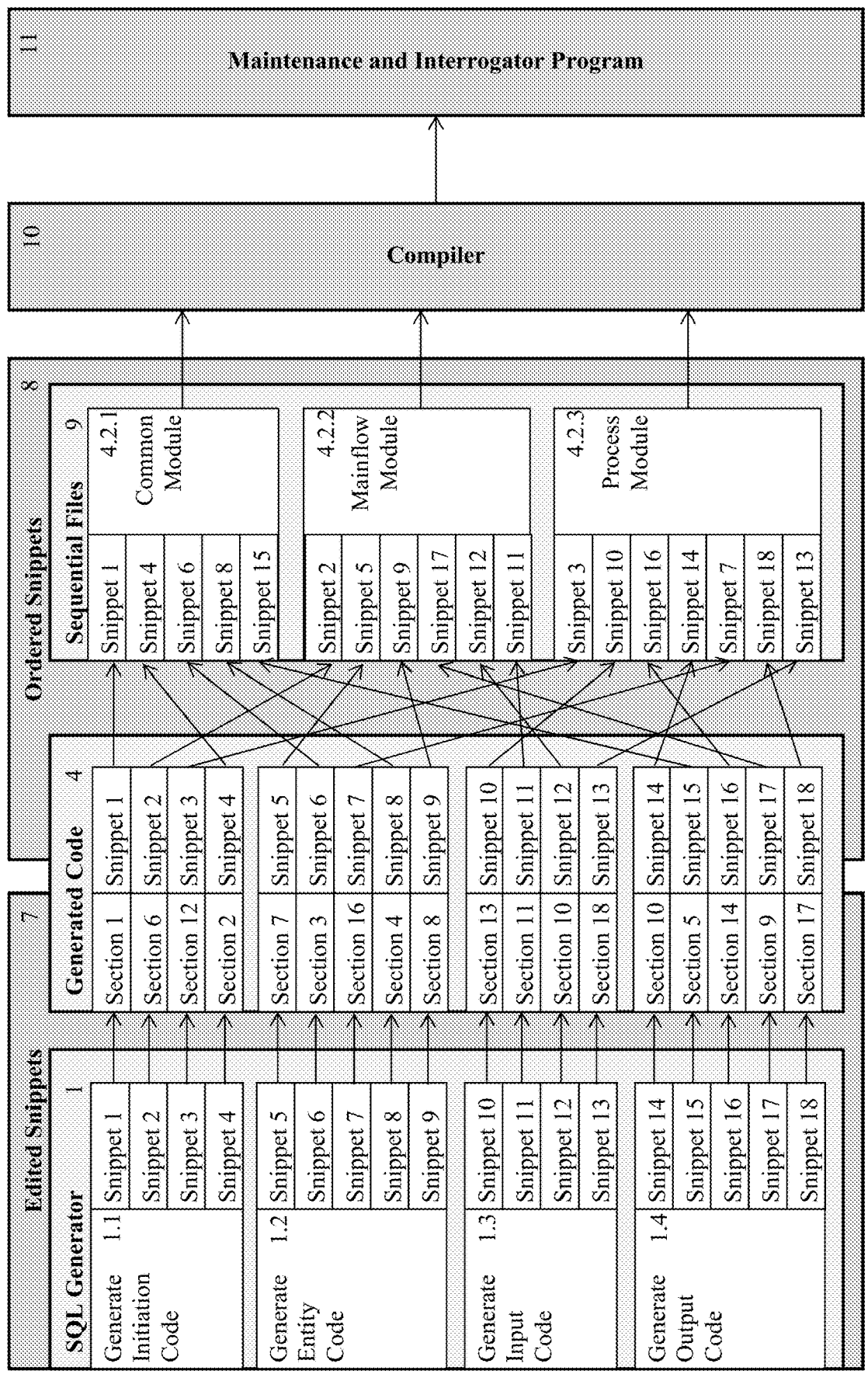

As previously stated, the edited snippets (7) are recorded in the generated code database (4) along with the calculated section and line numbers and thus the edited snippets (7) can be retrieved in the order required to construct the maintenance and interrogator program (11). FIG. 18 shows this graphically.

SQL Generator Components

With reference to FIG. 2, the SQL generator (1) consists of the following four primary modules that define the logic for constructing the computer program code:

Generate initiation code 1.1 (hereafter "initiation module")
Generate entity code 1.2 (hereafter "entity module")
Generate input processing code 1.3 (hereafter "input processing module")
Generate output processing code 1.4 (hereafter "output processing module")

Figure 3:
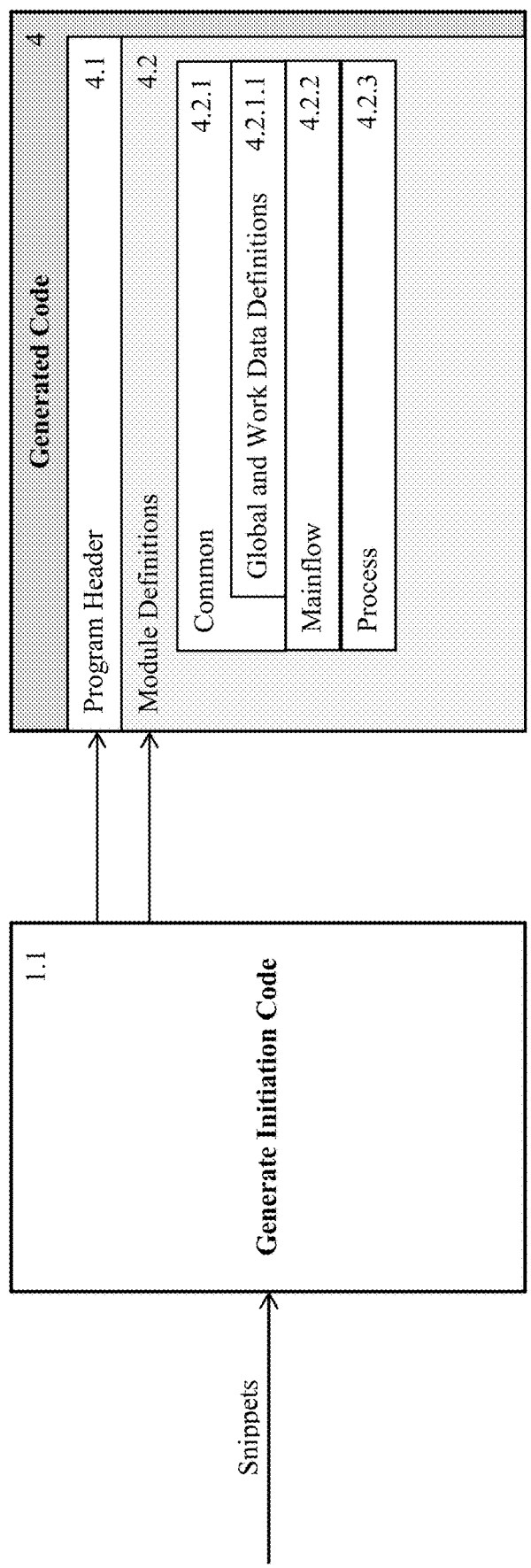

FIG. 3 shows the individual processes implemented by the initiation module 1.1 for defining the structure of the generated Code (4). As shown, snippets for the program header 4.1, which is necessary to instruct the compiler (10) about the maintenance and interrogator program (11), are accessed. The program header is retrieved into its own sequential file.

Snippets for the module definitions 4.2 split the generated code (4) into three sub-modules, or sections, which are retrieved into their own sequential files (9).

The common sub module 4.2.1 contains data definitions and commonly used sub-routines that are mainly generated by the generate entity code 1.2 module for the maintenance and interrogator program (11).

The mainflow sub module 4.2.2 controls the start and end of the maintenance and interrogator program (11) and the access to the various components constructed by the SQL generator (1) to action inputs and create outputs. It also includes components that are shared between the action input processes and between the created output processes.

The process sub module 4.2.3 contains the various components required to allow the maintenance and interrogator program (11) to action an input and to create an output. For most implementations, many edited snippets (7) will be included in this sub module which uses components in both the common and mainflow modules.

SQL Generator Methods

The SQL generator (1) contains two distinct methods of generating SQL statements.

The first method generates statements that return one set of related data which provides information upon which actions affecting addition, modification or removal of the information in the database (6) can be based.

In more detail, and in accordance with one embodiment, the first method uses primary key values to retrieve the information and is primarily used to retrieve information for maintenance of the database data. The method also creates the SQL statements required to add, modify, or remove information within the database (6).

The other method is designed to generate statements to return multiple sets of related data which can provide collections of information. This method may use primary key values to retrieve the information but also may use non-key values that exist within an entity. This method is primarily used for interrogation of the database (6) to provide related collections of data.

The difference between the two methods exists: but they overlap where an application needs to retrieve information for use in actions affecting maintenance but not all the necessary primary key values are available. In this case the interrogation method is used to provide the information and the maintenance restriction of only having one set of related data is enforced upon the result.

The methods are both individually described below.

Maintenance Operation

Figure 4:
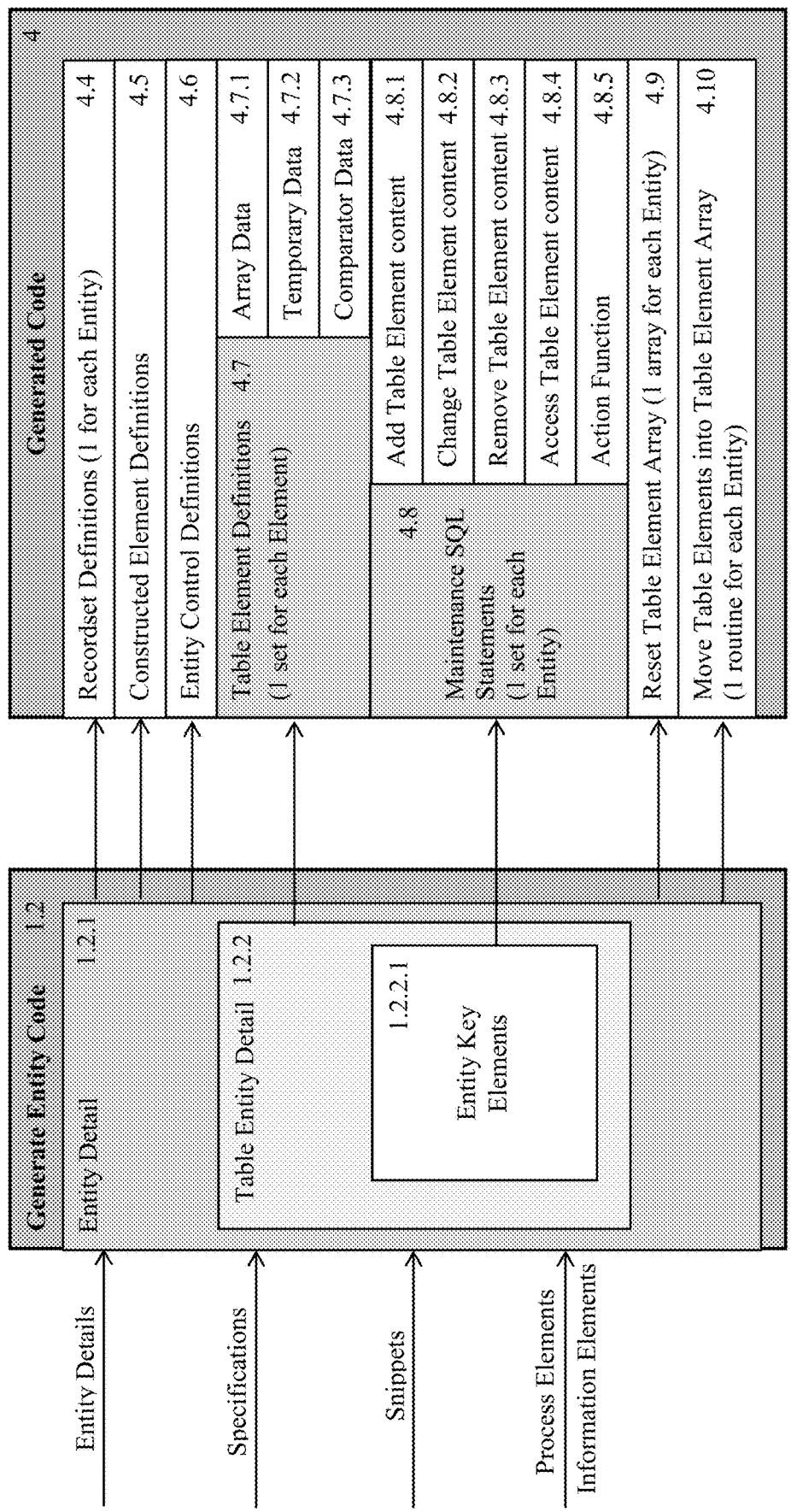

FIG. 4 schematically shows the generated code (4) constructed by the entity module 1.2 of the SQL generator (1).

Details of the entities 1.2.1, the table elements in each entity 1.2.2, the entity primary key elements 1.2.2.1 and the specifications are used to combine with appropriate snippets to construct the generated code (4).

The recordset definitions 4.4 allow one, or more, entity records to be read from an entity by the maintenance and interrogator program (11). One recordset is generated for each entity and is used whenever table elements from that entity are required within the maintenance and interrogator program (11). With the usual maintenance operation, the recordset is filled using primary key values and predefined SQL statements. Where the recordset requires filling using non-key values, the SQL statement is dynamically constructed using processing detailed in the interrogation operation.

By default, the recordset contains every table element in an entity record, irrespective of whether all, or just some, of the table elements are required for the processing or the output.

Constructed element definitions 4.5 are generated to allow activity through the maintenance and interrogator program

(11) to be recorded for tracing purposes. These are default routines that apply if requested.

Entity Control Definitions 4.6 are required depending on the operation of the application database (6) being maintained by the maintenance and interrogator program (11). The maintenance and interrogator program (11) can reference an application database (6) holding a snapshot view of the entity content or a history view of the entity content. With a history view all changes to the entity are preserved in sequence and the entity control definition is to ensure that the most recent table elements are provided when information is requested. With a snapshot view only the most recent table elements are recorded and there is no requirement for the entity control definitions.

All table elements access snippets to construct the table element definitions 4.7. There are three data definitions in the generated code (4) constructed for every table element found by the SQL Generator (1):

an array data definition 4.7.1 into which a table element can be stored from every entity record contained in a recordset;

a temporary data definition 4.7.2 into which a process element can be stored during processing;

a comparator data definition 4.7.3 in which a control value can be stored to affect the selection of table elements from the entity. The comparator value for this invention defaults to equal (=) but may be defined as LIKE, IN, BETWEEN, >, <, <=, >=, etc. if the process request is to change table elements, or remove entity records, or to retrieve a collection of records.

A table element can occur in more than one entity if it is a primary key element. As the definitions are generated, duplicate table elements are ignored.

Details on the primary key elements are also available and are used to generate the maintenance SQL statements 4.8 for the maintenance and interrogator program (11). These statements are fixed for each entity and use snippets to include all the table elements in each entity record as applicable.

The generated SQL for add process element content 4.8.1 is—
  INSERT INTO Entity (Table Element, Table Element, . . . )
  VALUES (Process Element value, Process Element value, . . . );

The generated SQL for Change Process Element content 4.8.2 is—
  UPDATE Entity SET Table Element=Process Element value, {SET Table Element=Process Element value,} . . .
  WHERE Table Element [Comparator value] Entity Primary Key value
  {AND Table Element [Comparator value] Entity Primary Key value} . . . ;

The generated SQL for Remove Process Element content 4.8.3 is—
  DELETE Entity
  WHERE Table Element [Comparator value] Process Element value
  {AND Table Element [Comparator value] Process Element value} . . . ;

The generated SQL for Access Table Element content 4.8.4 is—
  SELECT Table Element, Table Element, . . .
  FROM Entity
  WHERE Table Element [Comparator value] Entity Key value
  {AND Table Element [Comparator value] Entity Key value} . . . ;

(Notes: Italics=identified values, Not italics=supplied values, { }=optional, . . . =repetition, [ ] delimiter for clarity.)

The accessed data is moved from the application database (6) into the entity recordset 4.4. The maintenance SELECT in this invention should only access one entity record at a time. Any comparator value other than =may access more than one entity record. If more than one is accessed an error results and no table element values are selected. This error will be reported by the maintenance and interrogator program (11) to the application program (5) because it will only arise if the input content from the application program is, or happens to become, incorrect.

The action function generation 4.8.5 uses snippets to construct a routine so that the maintenance and interrogator program (11) can access any of the base SQL functions 4.8 as required by the input or the output. FIG. 11 expands on the relationship between the generated action function and the input or output.

The reset table element array 4.9 allows the maintenance and interrogator program (11) to clear the array data 4.7.1 for all the table elements in an entity record.

The move table elements 4.10 allows the maintenance and interrogator program (11) to access the values read into the entity recordset 4.4 by the access table element 4.8.4 and process and move them into the array data 4.7.1 where the content of the table element can be retrieved or changed.

Request Process Function (1.3.1)

Figure 5:
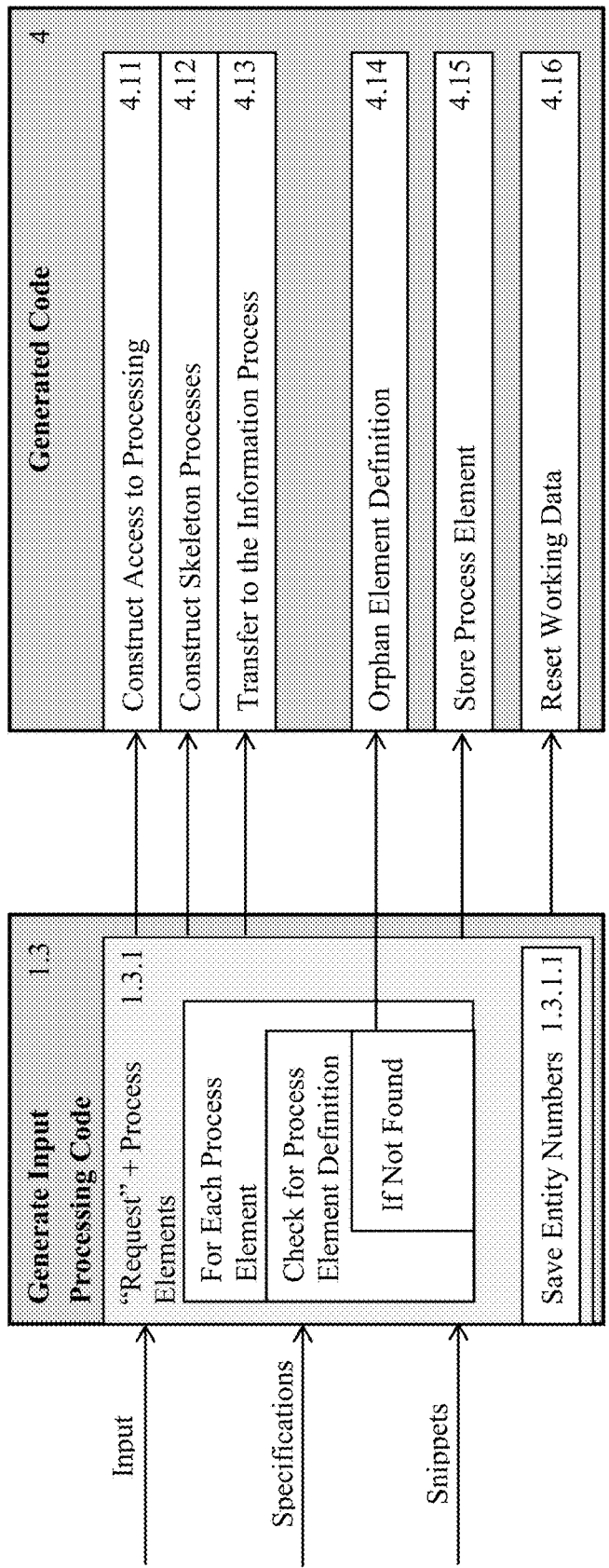

FIG. 5 shows an example for constructing the generated code (4) required for the maintenance and interrogator program (11) to process a maintenance request process function. This function is required when an application program (5) wants to access information. An output information process 1.4.1 will therefore follow the request process 1.3.1. For the maintenance and interrogator program (11) this will be a provide information function and indicates that there will only be one, and only one, collection of information in the output.

While a lot of the maintenance and interrogator program (11) processing may be reused within that program, each input requires a dedicated section of code in the maintenance and interrogator program (11) to control the processing for that input. This is generated in a skeleton form by the request process. Construct access to processing 4.11 generates access to the skeleton processes 4.12 and to the transfer to the information process 4.13.

The process elements attached to the input are analysed. Any process element that has not already been defined for the maintenance and interrogator program (11) by the generated code (4) has orphan element 4.14 definitions constructed for array data 4.7.1, temporary data 4.7.2 and comparator data 4.7.3 so that the maintenance and interrogator program (11) can process the orphan element as if it were a process element.

The process elements in the request function are stored 4.15 internally in the SQL Generator (1) and all the SQL Generator (1) internal control values are reset 4.16 to known starting values.

The process elements are also compared to the table elements to locate the entity in which the process element exists. These entities are held for use by the generation required for the information process 1.4.

Provide Information Function (1.4.1)

Figure 9:
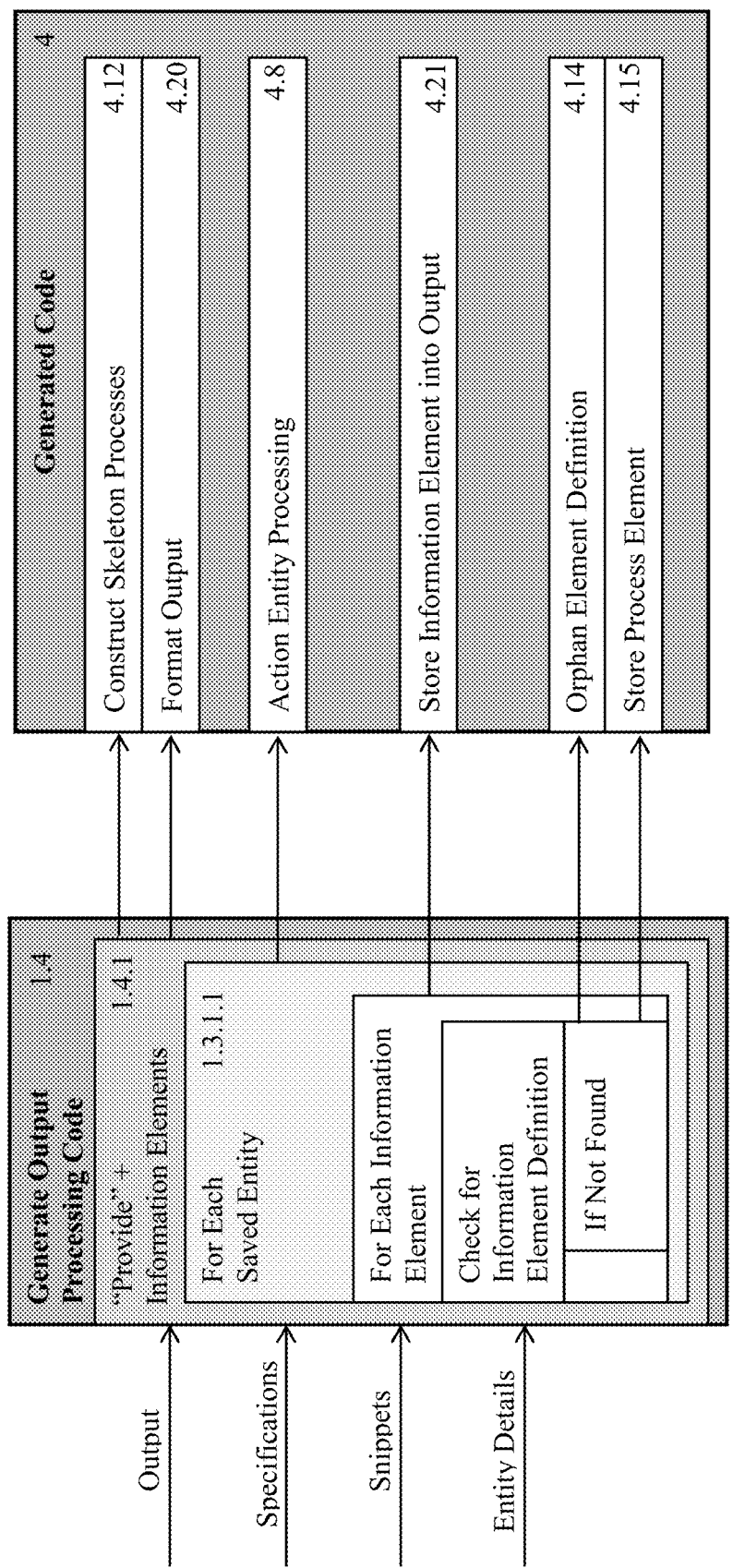

FIG. 9 shows an example for providing information elements 1.4.1. This is the next logical process after a request process function and edits the required snippets so that the maintenance and interrogator program (11) can locate and store the information elements to be returned through the output.

Skeleton processes 4.12 are constructed to contain the detail processing in the maintenance and interrogator program (11) for providing values in the information elements.

Snippets to format the information elements into the output are assembled 4.20 into the generated code (4).

For each of the saved entities 1.3.1.1, the action process 4.8 for the entity is executed. FIG. 11 shows that for provide, the reset table element array 4.9, access table element content 4.8.4 and move table elements 4.10 and store information element into output 4.21 will be used by the action process to generate the required code for the maintenance and interrogator program (11).

Snippets are edited to cause the maintenance and interrogator program (11) to move the required table elements into the information elements needed for the output. If the output does not require all of the table elements, then those not required are ignored by the maintenance and interrogator program (11).

The information elements attached to the input are analysed. Any information element that has not already been defined in the maintenance and interrogator program (11) by the generated code (4) has orphan element 4.14 definitions constructed for array data 4.7.1, temporary data 4.7.2 and comparator data 4.7.3 so that the maintenance and interrogator program (11) can process the orphan element as if it were an information element.

Add Process Function (1.3.2)

Figure 6:
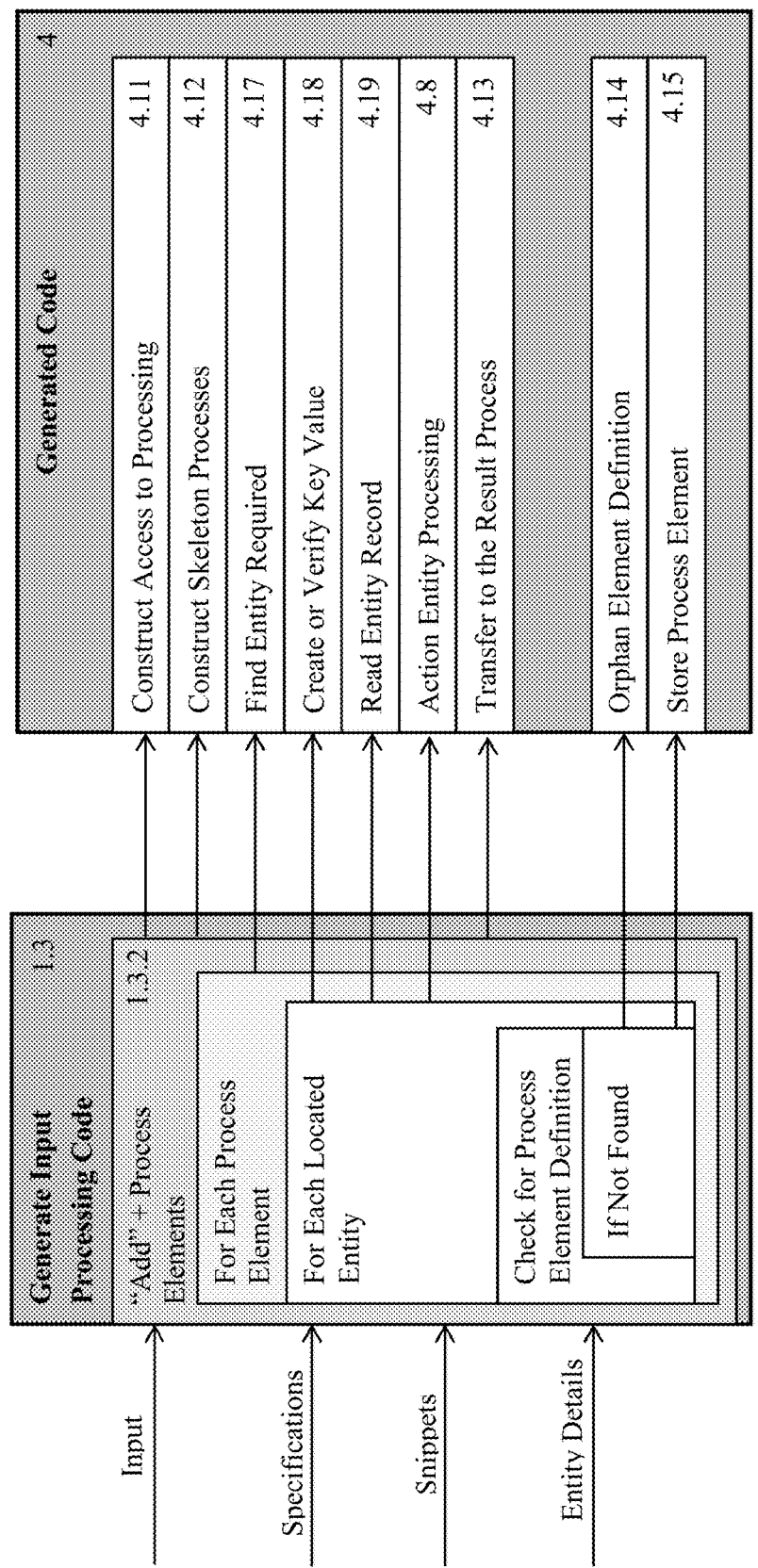

FIG. 6 shows an example for generating code (4) required to process an add process function 1.3.2. This function is used when an application program (5) wants to record new information in the application database (6). The success or failure of this recording by the maintenance and interrogator program (11) is returned to the application program (5) by use of a result output 1.4.2. That output will therefore follow the add process function 1.3.2.

An add process function 1.3.2 is required due to the application program's (5) determination of what is new information. The maintenance and interrogator program (11) has no control over that determination, which is based upon the way in which the user wants to use the application. This often reflects the forms and other sources from which the new information is derived. However, the maintenance and interrogator program (11) is designed to operate with strictly controlled entities and entity records. The SQL generator (1) is programmed to bridge this alteration from new information into new table element values and to generate code so that the maintenance and interrogator program (11) can record the table elements into the appropriate entity records as determined by the normalisation of the application database (6).

While a lot of the maintenance and interrogator program (11) processing is reused within that program, each input requires a dedicated section to control the processing for that function. This is generated in a skeleton form by the add process in the SQL Generator (1). Construct access to processing 4.11 generates the access to the skeleton processes 4.12 and the access to the transfer to the result process 4.13.

The process elements are analysed by the SQL Generator (1) against the table elements and the entities to which the table elements belong are identified 4.17. For each entity the primary key element is identified 4.18. The primary key for an entity may require more than one primary key element in which case all of the primary key elements required are identified. The entities required are identified by having primary key elements present in the process elements and at least one other table element present in the process elements from the same entity via the entity read 4.19.

The SQL Generator (1) generates code for the maintenance and interrogator program (11) to validate, or create, key element values 4.18, as will be described below with reference to FIG. 12.

The SQL Generator (1) generates code for the maintenance and interrogator program (11) to action the add process 4.8, as described below and with reference to FIG. 11.

The process elements attached to the input are analysed. Any process element that has not already been defined in the maintenance and interrogator program (11) by the generated code (4) has orphan element 4.14 definitions constructed for array data 4.7.1, temporary data 4.7.2 and comparator data 4.7.3 so that the maintenance and interrogator program (11) can process the orphan element as if it were a process element.

Figure 12:
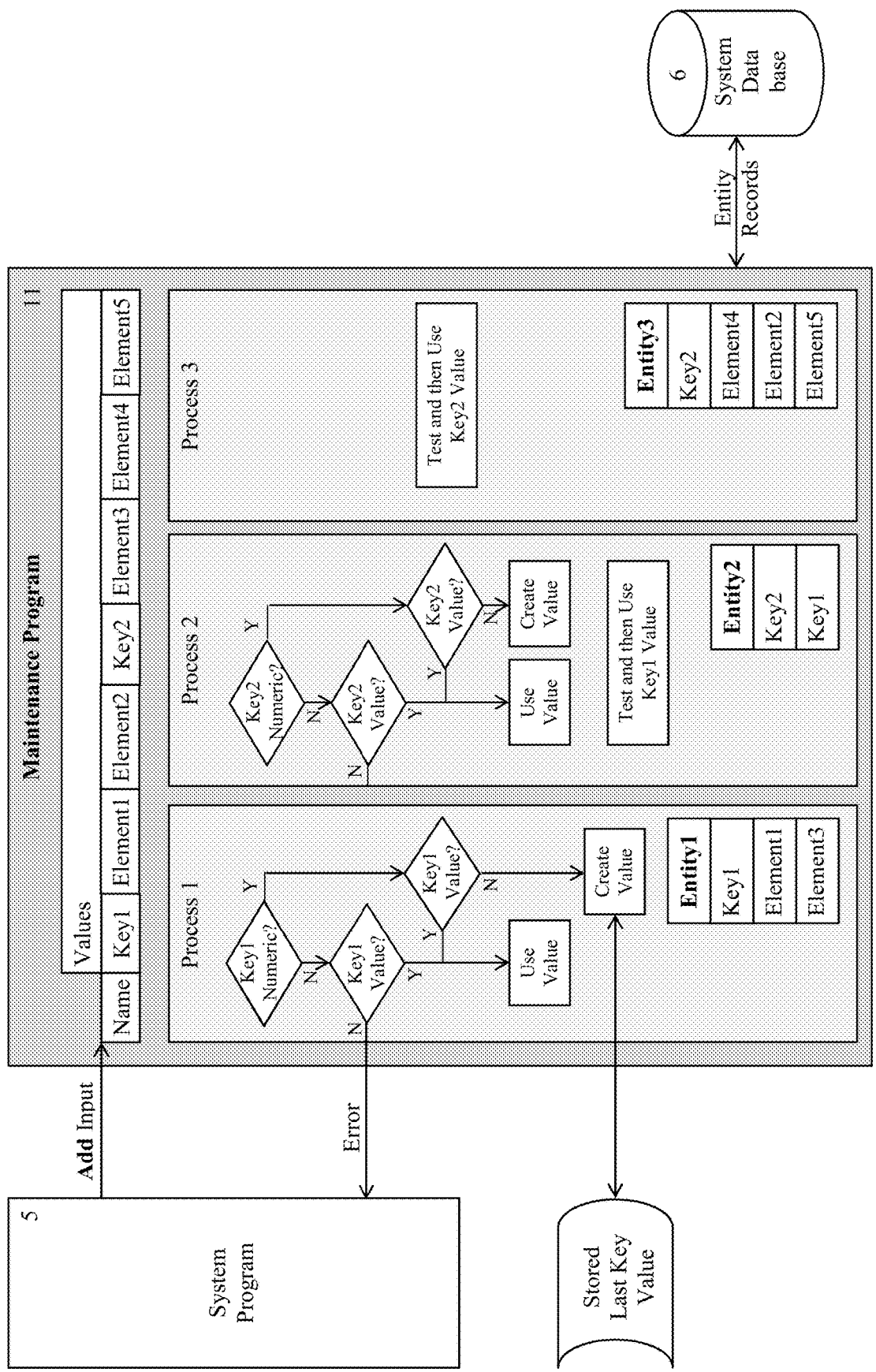

FIG. 12 shows an example process used to allocate values to primary key elements in the maintenance and interrogator program (11). The SQL generator (1) generates the appropriate code for this allocation for every add process function analysed by the SQL generator (1). The processes shown in FIG. 12 occur in sequence from left to right. The actual order of processing relative to the entities is determined by the order in which the entities were defined in database (2). The order is irrelevant to the SQL generator (1) operation.

The primary key element may have a value in the equivalent process element in which case that value will be used by the maintenance and interrogator program (11). If there is no value and the process element is numeric, the SQL generator (1) will generate code to allow the maintenance and interrogator program (11) to allocate the next available key value to the primary key element. If there is no value and the key element is not numeric, the maintenance and interrogator program (11) will report an error and cease the process.

Where the process elements are to be recorded over a quantity of entities (as shown in FIG. 12), the generated code (4) will ensure that the first value allocated to a primary key element by the maintenance and interrogator program (11) is used as the value of that primary key element by the maintenance and interrogator program (11) for all subsequent entities in which it occurs.

Where the process elements are spread over entities that have different key elements, the generated code (4) ensures that values will be allocated to all key elements as they are located by the maintenance and interrogator program (11) (as shown in the FIG. 12) and any entities providing a link between entities having different primary key elements will be recorded, as shown in Process 2, where the maintenance and interrogator program (11) allocates a value to Key 2 for the link before the entity record is added to Entity 3.

FIG. 11 shows example actions generated for an add process function. This code is common to any add process function 1.3.2 that affects the same entity. Generated code (4) is constructed to attempt to read the entity record 4.8.4. The generated code (4) causes the maintenance and interrogator program (11) to action the add process 4.8.1.

Adding information to the application database (6) through the maintenance and interrogator program (11) is not simply a matter of writing a new entity record into an entity. The distinct divide between the information supplied by an application program (5) and the table element values (data) recorded by the maintenance and interrogator program (11) means that several application programs can add new table element values into one or more entities as, and when, the information becomes available. Therefore the SQL generator (1) generates code so that the maintenance and interrogator program (11) will read the entity record 4.19, followed by a reset of the table element array to the base values 4.9, followed by movement of the recordset elements into the table elements 4.8.4, followed by a transfer of the process elements into the table elements 4.24, followed by an update of the entity with the existing, plus new, table element values as a new or updated entity record 4.26.

Where the maintenance and interrogator program (11) is working with a history view of the entities, the update always creates a new entity record since there is a trace being kept of the original and the updated table elements. Where the maintenance and interrogator program (11) is working with a snapshot view of the entities then if the read is successful the entity record is updated and if the read is unsuccessful a new entity record is created by the maintenance and interrogator program (11).

Change Process Function (1.3.3)

Figure 7:
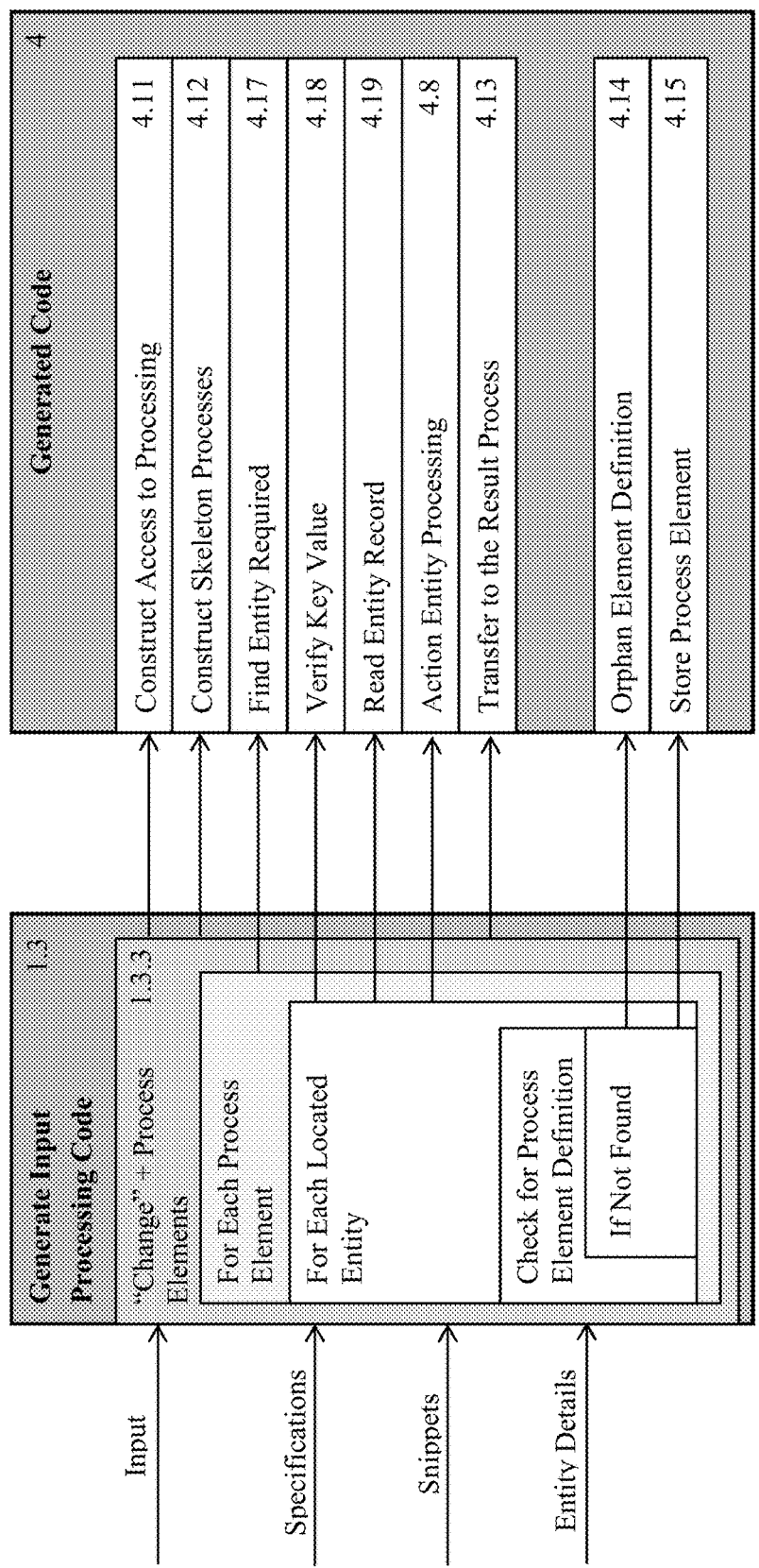

FIG. 7 shows an example for processing a change process function. This function is implemented when an application program (5) wants to record altered information in the application database (6). The success or failure of this recording by the maintenance and interrogator program (11) is returned to the application program by use of a result output process 1.4.2. That output process will therefore follow the change process function 1.3.3.

A change process function is required due to the application program's determination of what is changed information. The maintenance and interrogator program (11) has no control over that determination, which is based upon the way in which the user wants to use the application. This often reflects the forms, and other sources, from which the information is derived and the content of the entity records already in the application database (6). However, the maintenance and interrogator program (11) is designed to operate with strictly controlled entities and entity records. The SQL generator (1) is programmed to bridge this alteration from changed information into changed table element values and to generate code so that the maintenance and interrogator program (11) can alter the table elements in the appropriate entity records as determined by the normalisation of the application database (6).

While much of the maintenance and interrogator program (11) processing is reused within that program, each input requires a dedicated section to control the processing for that function. This is generated in a skeleton form by the change process in the SQL generator (1). Construct access to processing 4.11 generates the access to the skeleton processes 4.12 and the access to the transfer to the result process 4.13.

The process elements are analysed by the SQL generator (1) against the table elements and the entities to which the table elements belong are identified 4.17. For each entity the primary key element is identified 4.18. The primary key for an entity may require more than one key element in which case all of the primary key elements required are identified. The entities required are identified by having key elements present in the process elements and at least one other table element present in the process elements from the same entity. For the change process all the key values must be supplied by the application program (5) and the generator creates code so that the maintenance can access the specific record(s) to be changed.

The SQL generator (1) generates code for the maintenance and interrogator program (11) to action the change process. This is described below with reference to FIG. 11.

The process elements attached to the input are analysed. Any process element that has not already been defined in the maintenance and interrogator program (11) by the generated code (4) has orphan element 4.14 definitions created for array data 4.7.1, temporary data 4.7.2 and comparator data 4.7.3 so that the maintenance and interrogator program (11) can process the orphan element as if it were a process element.

FIG. 11 shows the actions generated for a change process function. This code is common to all change process functions 1.3.3 that affect the same entity. Generated code (4) is constructed to attempt to read the record from the entity 4.8.4. The generated code (4) causes the maintenance and interrogator program (11) to action the change process 4.8.2.

Changing information in the application database (6) through the maintenance and interrogator program (11) is not just a matter of updating an entity record in an entity. The distinct divide between the information supplied by an application program (5) and the table element values (data) recorded by the maintenance and interrogator program (11) means that several application programs (5) can change table element values in one or more entities as, and when, the changed information becomes available. Therefore the SQL generator (1) generates code so that the maintenance and interrogator program (11) will read the entity record 4.19, followed by a reset of the table element arrays to the base values 4.9, followed by access of the table elements 4.8.4, followed by movement of the recordset elements into the table elements 4.10, followed by a transfer of the process elements into the table elements 4.25, followed by an update of the entity with the existing, plus changed, table element values 4.26.

Where the maintenance and interrogator program (11) is working with a history view of the entities, the update always creates a new entity record since there is a trace being kept of the original and the updated table elements. Where the maintenance and interrogator program (11) is working with a snapshot view of the entities then if the read is successful the entity record is updated. With either view of the entities if the read is unsuccessful an error is reported by the maintenance and interrogator program (11) and cease the process.

Remove Process Function (1.3.4)

Figure 8:
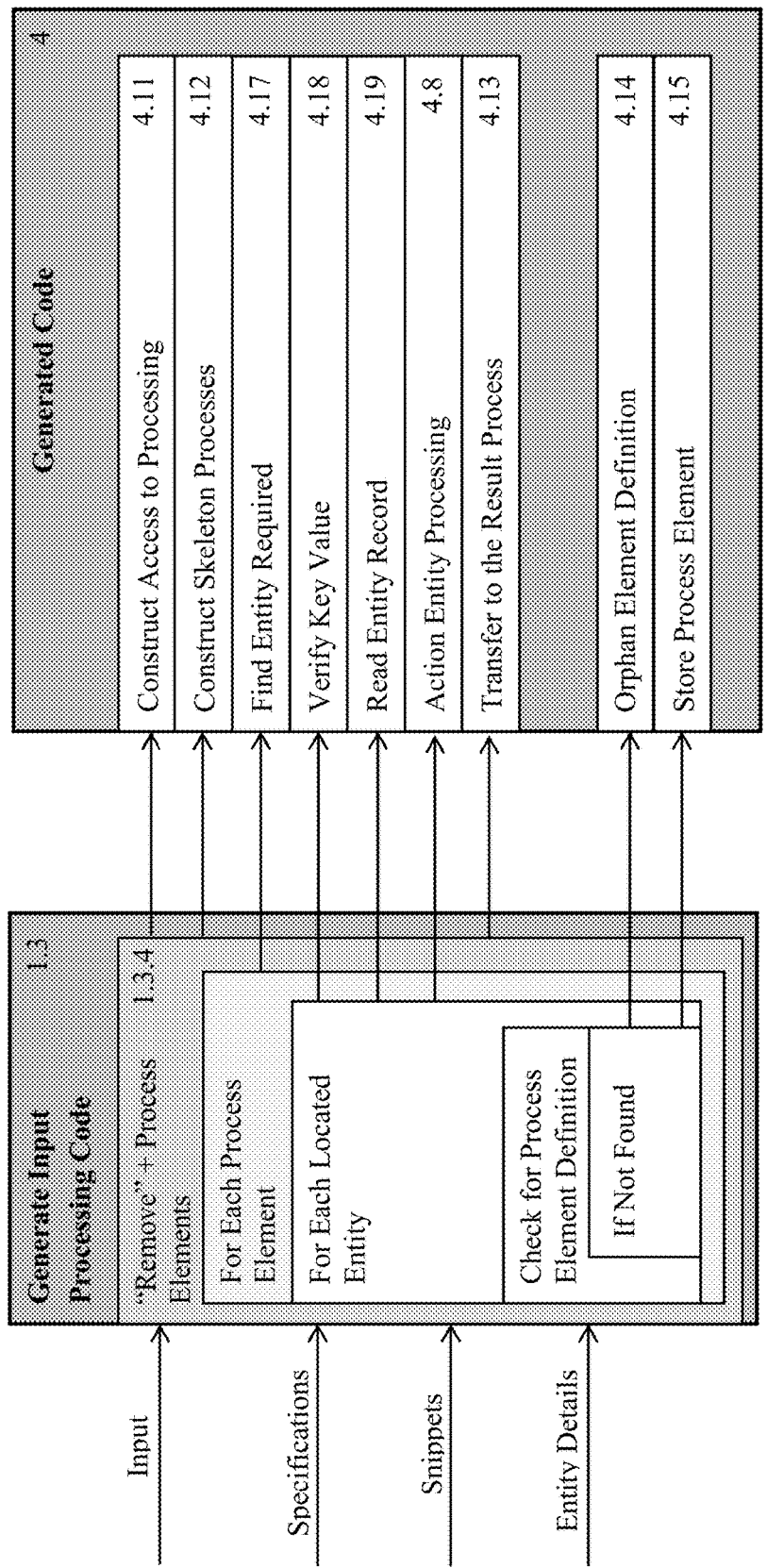

FIG. 8 shows an example for processing a remove process function. This function is required by the maintenance and interrogator program (11) when an application program (5) wants to remove information from the application database (6). The success or failure of this removal by the maintenance and interrogator program (11) is returned to the application program by use of a result output process 1.4.2. That process will therefore follow the remove process function 1.3.4.

The SQL generator (1) constructs processing to delete or cancel entity records identified by the remove process function process elements. Where table entity values should be removed from within an entity record then the change process function process 1.3.3 should be used to vary the table element to an empty value.

A remove process function is required by the application program's (5) determination of what should be removed information. The maintenance and interrogator program (11) has no control over that determination which is based upon the way in which the user wants to use the application. This often reflects the forms, and other sources, from which the information is derived and the content of the entity records already in the application database (6). However, the maintenance and interrogator program (11) is designed to operate with strictly controlled entities and entity records. The SQL generator (1) is programmed to bridge this alteration from removed information into removed entity records so that the maintenance and interrogator program (11) can delete the appropriate entity records as determined by the normalisation of the application database (6).

While much of the maintenance and interrogator program (11) processing is reused within that program, each input requires a dedicated section to control the processing for that function. This is generated in a skeleton form by the remove process in the SQL generator (1). Construct access to processing 4.11 generates the access to the skeleton processes 4.12 and the access to the transfer to the result process 4.13.

The process elements are analysed by the SQL generator (1) against the table elements and the entities to which the table elements belong are identified 4.17. The removal will occur for all entity records in all entities that can be identified from the process elements. This can be very wide ranging and the effect of the code generated for the maintenance and interrogator program (11) is not constrained.

The SQL generator (1) generates code for the maintenance and interrogator program (11) to action the removal process. This process will be described below with reference to FIG. 11.

The process elements attached to the input are analysed. Any process element that has not already been defined in the maintenance and interrogator program (11) by the generated code (4) has orphan element 4.14 definitions constructed for array data 4.7.1, temporary data 4.7.2 and comparator data 4.7.3 so that the maintenance and interrogator program (11) can process the orphan element as if it were a process element.

Since generation for the remove process uses the process elements to identify the entity records to be removed, a process element that has not been identified as a table element will have no effect on the application database (6) entities. Hence this is a preventative generation to stop the maintenance and interrogator program (11) from failing.

FIG. 11 shows example actions generated for a remove process function. This code is common to all remove process functions 1.3.4 that affect the same entity. The generated code (4) actions the remove process 4.8.3.

Removing information from the application database (6) through the maintenance and interrogator program (11) is not just a matter of deleting an entity record from an entity. The distinct divide between the information supplied by an application program (5) and the table element values (data) recorded by the maintenance and interrogator program (11) means that several application programs (5) can remove entity records in one or more entities as, and when, directed. The process elements input with the remove function determine the entities to be affected. These elements may refer to key elements or table elements.

Where the maintenance and interrogator program (11) is working with a history view of the entities, the removal never deletes an entity record since there is a trace being kept of application database (6) changes. Instead the removal isolates the entity record by cancelling any link between it and any other entity record.

Where the maintenance and interrogator program (11) is working with a snapshot view of the entities then the entity record is deleted from all entities in which it can be identified (i.e. table records containing the entity value will be deleted and any table records linking the deleted table record to other table records will be deleted).

Result Information Function (1.4.2)

Figure 10:
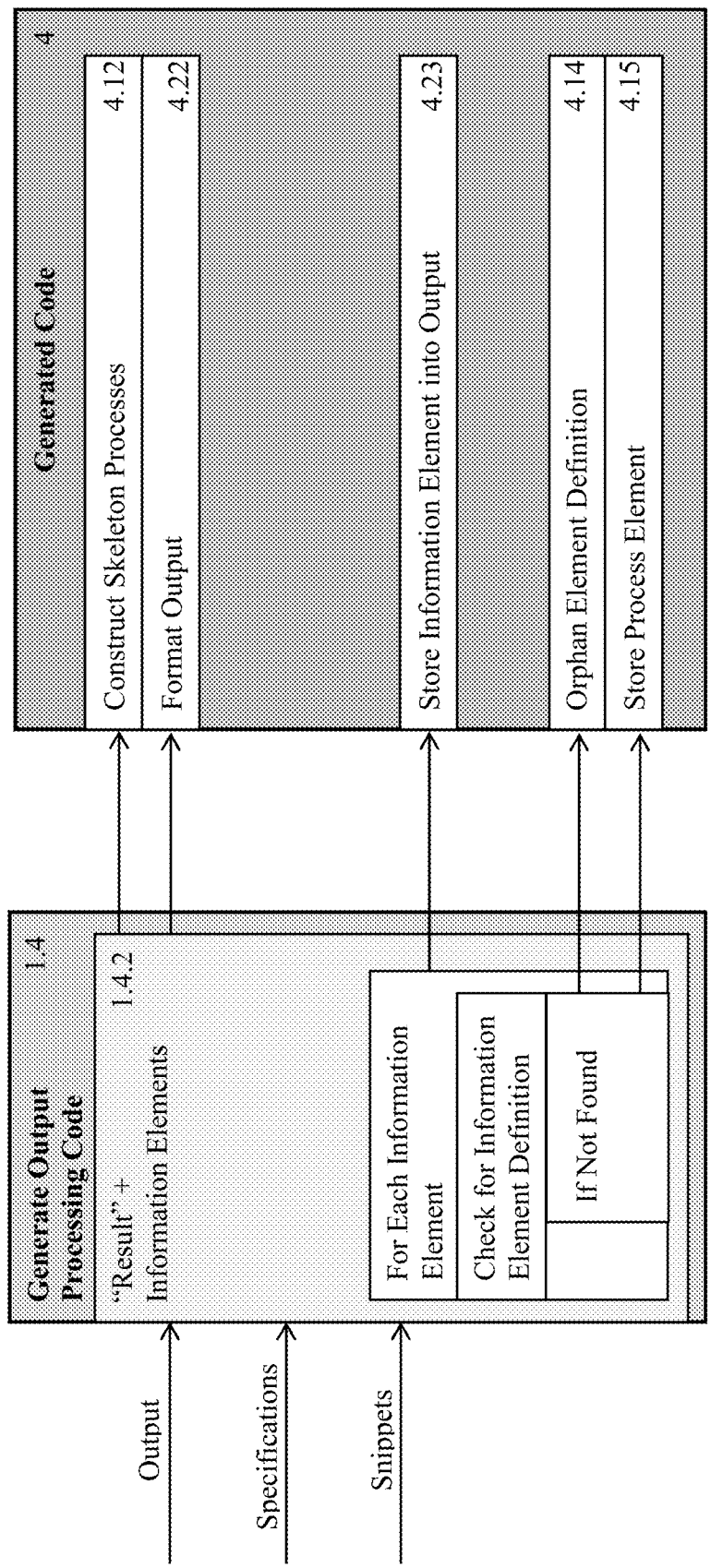

FIG. 10 shows an example for creating a result output 1.4.1. Result is the next logical process after any maintenance input other than request and will locate and store the information elements to be returned through the output. The maintenance and interrogator program (11) may have filled the result information elements with values during the input processing and it is those values that will be returned in the output.

The information elements attached to the input are analysed. Any information element that has not already been defined in the maintenance and interrogator program (11) by the generated code (4) has orphan element 4.14 definitions constructed for array data 4.7.1, temporary data 4.7.2 and comparator data 4.7.3 so that the maintenance and interrogator program (11) can process the orphan element as if it were an information element. Since generation for the result process uses the information elements to identify the table elements to be output, an information element that has not been identified as a table element will always return an empty value. Hence this is a preventative generation to stop the maintenance and interrogator program (11) from failing.

While much of the maintenance and interrogator program (11) processing is reused within that program, each output requires a dedicated section to control the processing for that function. This is generated in a skeleton form 4.12 by the result process in the SQL generator (1).

Snippets to format the information elements into the output are assembled 4.22.

Snippets are edited to move the required table elements into the information elements needed for the output 4.23. If the output does not require all of the table elements then those not required are ignored. The output is transmitted back to the application program (5) as a single output record by the maintenance and interrogator program (11). The output may include a result (success of failure) and suitable error messages if failure.

Interrogation Operation

Interrogation follows the same generation sequence as has been described for maintenance, except that there are less distinct functions involved and greater complexity in the processing to create the generated code. This operation will also be used if access to information for maintenance requires values that are not primary key values to be used to identify the information.

Figure 13:
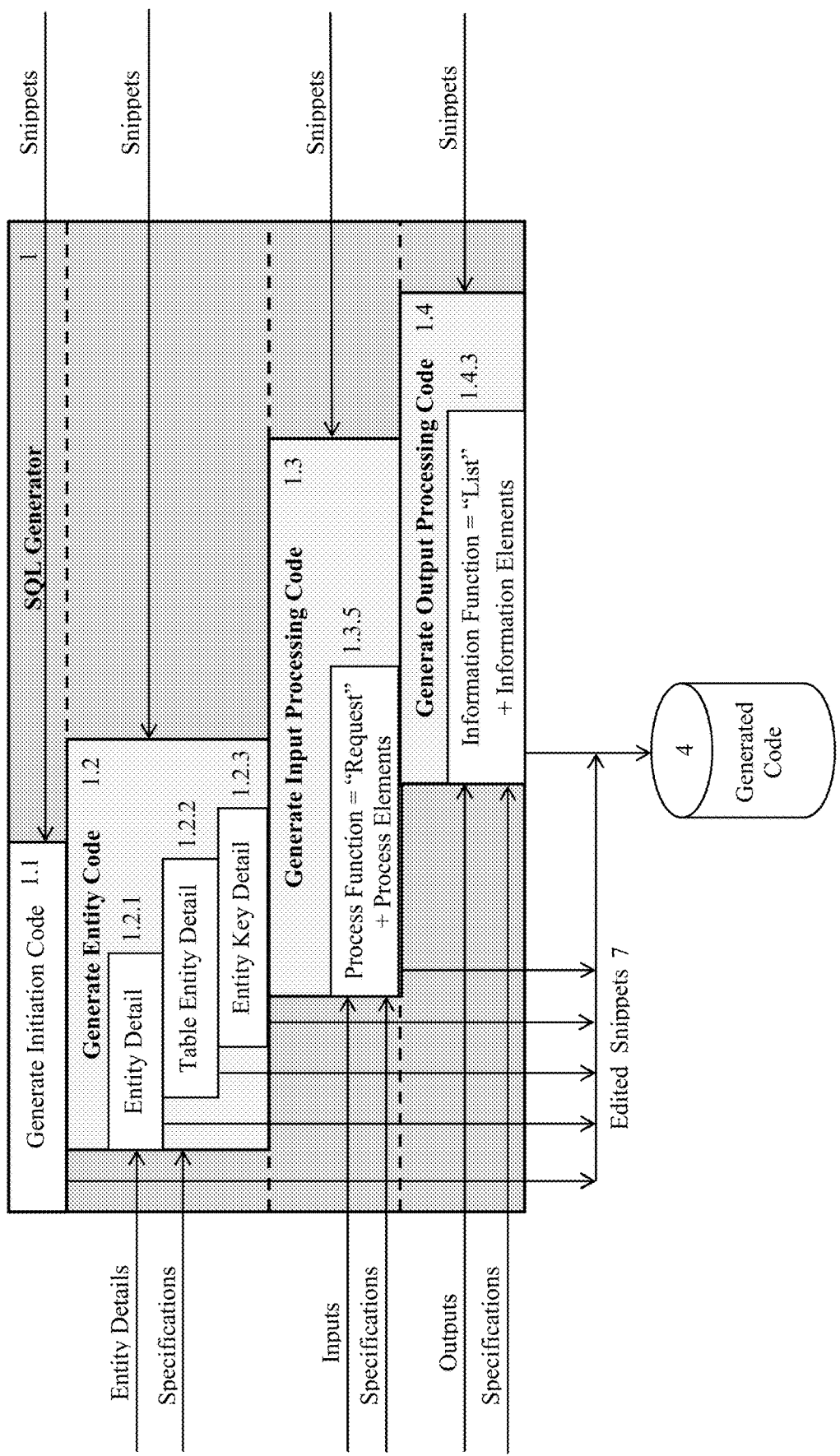
Figure 14:
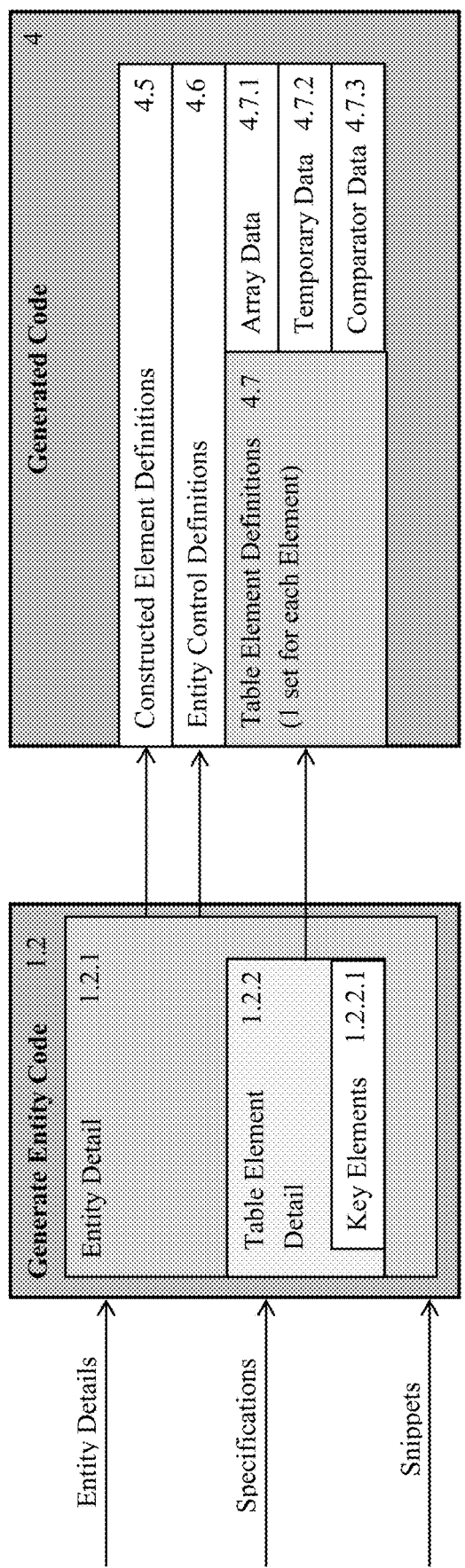

FIG. 13 shows the main blocks of function for the interrogation operation. Generate initiation code and generate entity code have already been described for the maintenance operation. Mostly these do not vary for interrogation. FIG. 3 and the part of FIG. 4 shown in FIG. 14 and the associated descriptions apply.

Request Process Function (1.3.5)

Figure 15:
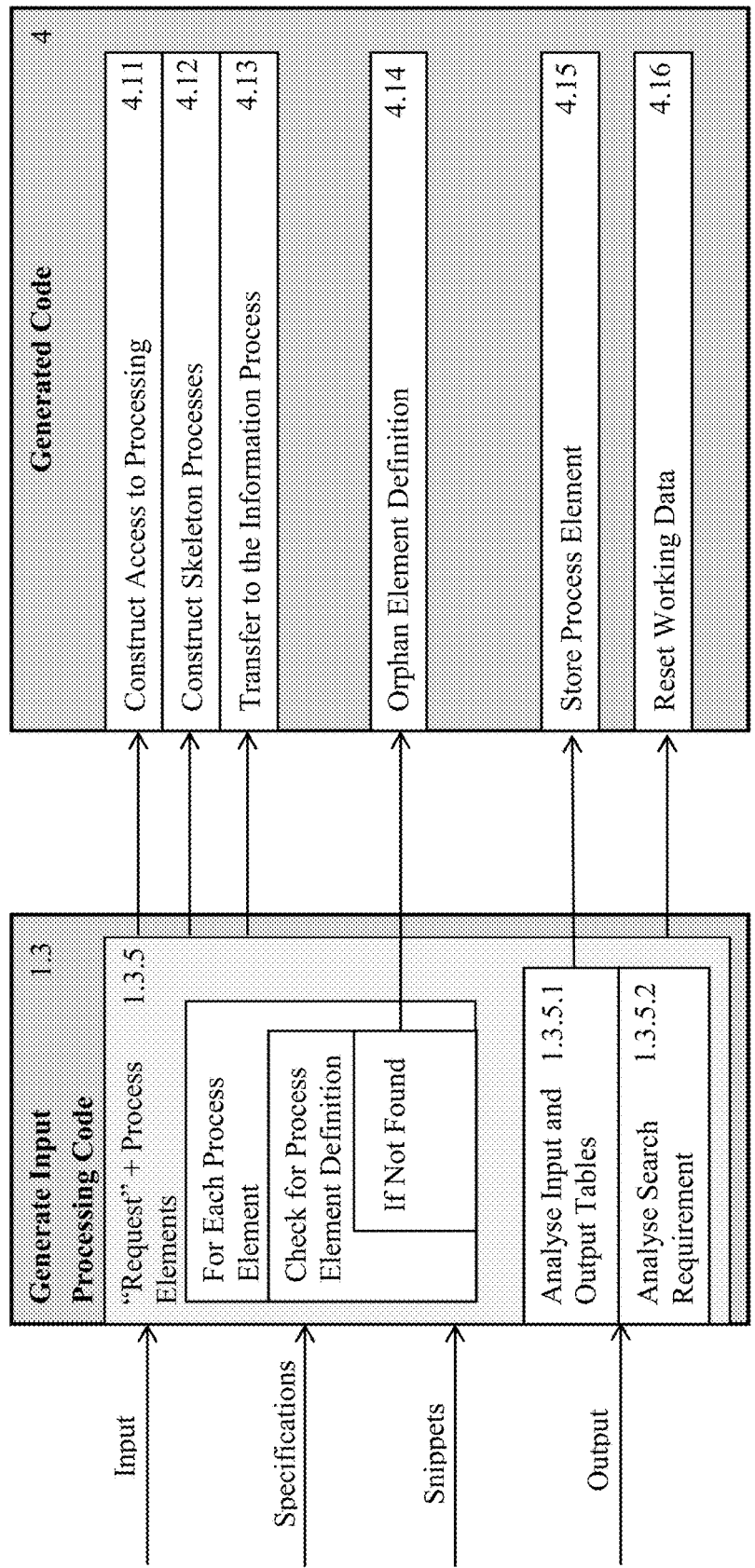

FIG. 15 is an example showing a request process function for interrogation. This function is required by the maintenance and interrogator program (11) when an application program (5) wants to access information. An output information process will therefore follow the request process. For interrogation this will always be a list information function and indicates that there may be many collections of related data in the output.

While much of the maintenance and interrogator program (11) processing is reused within that program, each input requires a dedicated section of code in the maintenance and interrogator program (11) to control the processing for that input. This is generated in a skeleton form by the request process. Construct access to processing 4.11 generates access to the skeleton processes 4.12 and to the transfer to the information process 4.13.

The process elements attached to the input are analysed. Any process element that has not already been defined for the maintenance and interrogator program (11) by the generated code (4) has orphan element 4.14 definitions constructed for array data 4.6.1, temporary data 4.6.2 and comparator data 4.6.3 so that the maintenance and interrogator program (11) can process the orphan element as if it were a process element.

The process elements identified by the request process function (FIG. 5) and the list information function (FIG. 17) are stored 4.15 internally in the SQL generator (1). They act as control data for later SQL generator (1) processes. The SQL generator (1) internal control values are reset 4.16 to known starting values.

Because this input is to create a list of information, the SQL generator (1) conducts an exhaustive analysis of the process elements supplied in the input, the information elements required for the output, the table elements in the entities and the relationship of an entity to other entities in the application database (6). This analysis is outlined in FIG. 16.

Figure 16:
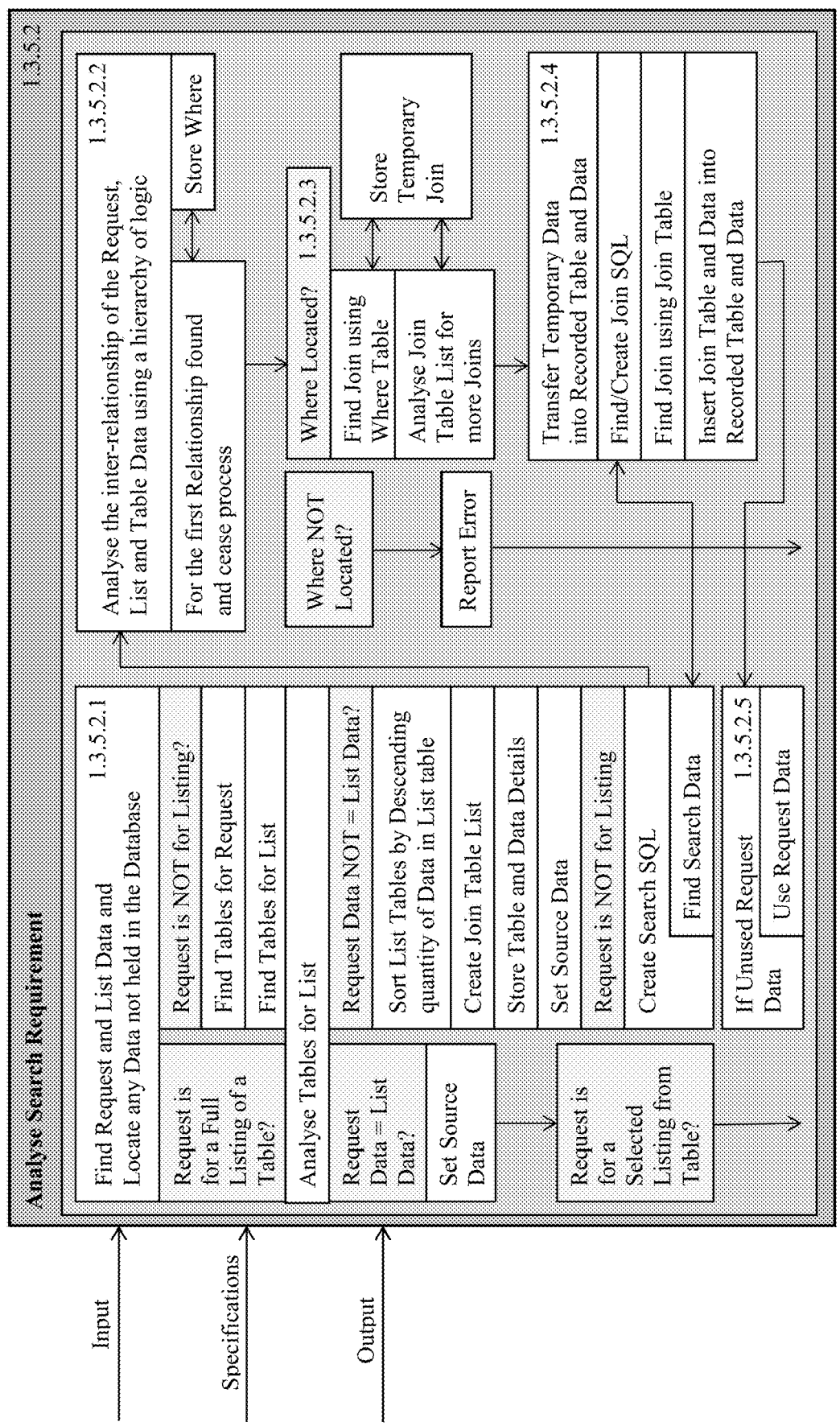

SQL Search Construction (FIG. 16)

The SQL generator (1) is programmed to analyse the construction of edited snippets (7) to allow the maintenance and interrogator program (11) to list information located by one of three SQL statement constructs depending upon the results of the analysis, or upon a request process element provided by the input.

1. Where the first Request Process Element contains the value "List"
   any other Request Process Elements will be ignored
   the content of all List Information Elements held in the application database (6) will be included in the list but must derive from one, and only one, entity.

For distinction this is referred to as a "listing" and is intended to provide the table element content from entities without any search conditions being specified. The general format of this selection is—
   SELECT  Source.Table  Element,  Source.Table Element, . . . FROM Source;

2. Where the analysis of the elements and relationships result in all the information elements being sourced from one entity, a simple select will be constructed having only a Where clause to control the information selection. The general format of this selection is—
   SELECT  Source.Table  Element,  Source.Table Element, . . . FROM Source
   WHERE Source.Table Element [Comparator] Process Value {AND Source.Table Element [Comparator] Process Value} . . . ;

3. Where the analysis of the elements and relationships result in the information elements being sourced from more than one entity, a complex select will be constructed having both Where and Inner Join clauses to control the information selection. The general format of this selection is—

SELECT *Entity1*.Table Element, *EntityX*. Table Element, ...
FROM *Entity1*
INNER JOIN *Entity2* ON *Entity2*.Table Element = *Entity1*.Table Element
{(AND *Entity2*.Table Element [Comparator] Process Value 2
{OR *Entity2*.Table Element [Comparator] Process Value X} ...)
} ...

{INNER JOIN *Entity3* ON *Entity3*.Table Element = *Entity1*.Table Element
{(AND *Entity3*.Table Element [Comparator] Process Value 3}
{OR *Entity3*.Table Element [Comparator] Process Value X} ...)
} ...
{INNER JOIN *Entity4* ON *Entity4*.Table Element = *Entity3*.Table Element
{(AND *Entity4*.Table Element [Comparator] Process Value 4}
{OR *Entity4*.Table Element [Comparator] Process Value X} ...)
} ...
WHERE *Entity1*.Table Element [Comparator] Process Value 1
{OR *Entity1*.Table Element [Comparator] *Process Value X*}
{AND *Entity1*.Table Element [Comparator] Process Value 1.1
{ OR *Entity1*.Table Element [Comparator] Process Value X}
...) }
...;

(Notes: Italics = identified values, Not italics = supplied values, { } = optional, ... = repetition, [ ] delimiter for clarity.)

FIG. 16 contains blocks of boxes delimited by the middle level background. These are numbered for reference but the internal boxes are not numbered. They will be designated by their title. The lighter background boxes are for key decisions required in the analysis process.

The analysis 1.3.5.2.1 commences with 'Find Request and List Data and Locate any Data not held in the Database'. This is a simple process of identifying the entities and table elements detailed in the process elements and the information elements. The entity and table element identifiers are stored internally. For any information element that is not contained in an entity, the need to create that element is also recorded internally. All table element identifiers that do not need creation are placed into an ordered, comma delimited, data area called the From_List.

The content of the first process element is tested. If the value is "List", a "Listing" is required and the next step is bypassed. List type 1 has been identified.

'Find Tables for Request' creates an internal list of entity identifiers for the entities containing the table elements identified by process elements.

'Find Tables for List' creates an internal list of entity identifiers for the entities containing the table elements identified by information elements.

For each of the entities found in 'Find Tables for List', 'Analyse Tables for List' locates the table element identifiers within the entity identified in the information elements. These are placed into an ordered, comma delimited, data area called the Table_List. The Table_List is compared to the From_List and if the two match then the analysis has found the source entity and a type 2 list has been identified. Otherwise, the analysis continues.

In 'Sort List Tables by Descending quantity of Data in List Table' each entity containing the information list, information elements is sorted and identified, 'Create Join Table List' identifies the table elements and entities required for the output and places the entity identifiers into a comma delimited list (the Join_List) in descending order of quantity of required table elements. 'Store Table and Data Details' stores the entity and the table element identifiers in internal storage. Each table element is added to a Data_List to prevent the table element being selected twice for internal storage and to prevent an entity that no longer contains a table element which is not already stored from being added to the Join_List.

'Set Source Data' sets the source to the entity having the largest number of table elements required by the information elements.

Irrespective of the relationship between the From_List and the Table_List, if the request is not for a Listing, the analysis continues.

'Create Search SQL' creates a comma delimited list of element identifiers known as the Search_List. They are first located by the element identifier being in the process elements and NOT in the information elements. If no element identifiers are located, then location is tried for element identifiers being in both the process elements and in the information elements. If there are still no elements in the Search_List, the 'Find Search Data' process is used.

'Find Search Data' locates the element identifiers that exist in the entity having the largest number of table elements in the input that also occur in the output or do not occur in the output. This process has two uses and the strange logic allows this reuse.

1.3.5.2.2 'Analyse the inter-relationship of the Request, List and Table Data using a hierarchy of logic' is a collection of SQL statements that seek to establish a relationship between elements so that the first content of the Where clause can be established.

If a Search_List has been identified then those elements in the input that are in the Search_List and are in the identified source entity will be internally stored for use in the Where clause. Otherwise a trial and error process is commenced.

The elements required for the Where clause are first selected when the element is in the information elements and is a primary key element and the element is in the process elements. Any identified elements will be internally stored for use in the Where clause. The entity that is identified is stored for use as the source entity.

If no Where clause elements have been identified, then the elements required for the Where clause are selected when the element is in the information elements and the element is in the process elements. Any identified elements will be internally stored for use in the Where clause. The entity that is identified is stored for use as the source entity.

If no Where clause elements have been identified, then the elements required for the Where clause are selected when an element identifier is in the information elements and is a primary key and an element identifier is in the process elements and is a primary key and both element identifiers occur in the same entity. Any identified elements will be internally stored for use in the Where clause. The entity that is identified is stored for use as the source entity.

If detail for the Where clause has been found and the From_List does not equal the Table_List, the join situation is then analysed. Otherwise, if no Where clause detail has been found, an error is reported and the SQL generation (1) ceases for this request.

Block 1.3.5.2.3 starts the analysis of the inner join clauses required to construct the SQL to create the specified information elements. 'Find Join using Where Table' sets up three internal control data areas:

A comma delimited list of entity identifiers set to the Join_Entity_List created in the previous 'Create Join Table List' process A Last_Join_Entity is initially set to the Where clause entity A comma delimited list of entity identifiers in the Join_Entity_Done list is initially set to contain only the Where clause entity.

The join details being located through the following logic are:

INNER JOIN Join_Entity ON Join_Entity.Table Element=Link_Entity.Table Element where Table Element is the same in the Join Entity and the Link Entity and where the value may have been supplied to the SQL generator (1), or derived from the application database (6) by the maintenance and interrogator program (11).

Join details are found for entities where the joining entity identifier is IN (understood as SQL for one in many alternatives) the Join_Entity_List and NOT IN the Join_Entity_Done list and the joining Table Element Identifier is IN the Last_Join_Entity and is flagged as a primary key and the linking entity identifier is also equal to the Last_Join_Entity. For EACH of the join entities found, The Join_Entity_Done list has the Entity Identifier of the located Join Entity added to the list. 'Store Temporary Join' stores the join detail internally if it has not already been stored. The Join_Entity_Done list has the entity identifier of the located join element added to the list. The Last_Join_Entity is updated with the entity identifier of the located join entity element.

If there are still entity identifiers in the Join_Entity_List further searches are done in 'Analyse Join Table List for more Joins' to identify other join details. This first searches for Entities where there is a table element IN the Entity identified by the Last_Join_Entity and is a flagged as a primary key and the entity also contains a table element IN an entity identified by being included in the Join_Entity_Left list. Any entity identified is stored internally as a Temporary_Link. If a link has been located, the join details are located using the Temporary_Link and the Last_Join_Entity. For EACH of the join entities found, 'Store Temporary Join' stores the join detail. The Join_Entity_List has the entity identifier of the located join entity removed from the list. The Last_Join_Entity is updated with the entity identifier of the located join table element.

There is a final search for join details using the primary key table elements in the Last_Join_Entity and the entity identifiers still in the Join_Entity_Left list. For EACH of the join entities found 'Store Temporary Join' stores the join detail. The Join_Entity_List has the entity identifier of the located join entity removed from the list. The Last_Join_Entity is updated with the entity identifier of the located join table element.

At this point all the join detail that has been located is stored in an internal temporary join area.

1.3.5.2.4 is a block of code that makes the temporary join detail permanent for use when constructing the SQL statements required for the maintenance and interrogator program (11) interrogation function. For EACH of the temporary joins— the temporary join detail is moved to the permanent detail Execute 'Find/Create Join SQL' using 'Find Search Data'

'Find Search Data' locates the element identifiers that exist in the join entity that also occur in the output or do not occur in the output. This process has two uses and the strange logic allows this reuse.

If a Search_List is returned, join details are created for each table element in the Search_List These join details are INSERTED into the permanent join details after the join entity used for the search. These join details are signified by having no link entity specified. They will be used to create Join clauses as—

AND Join Entity.Table Element [Comparator] Process Value

The process element equal to the table element is cancelled in the internal records.

When the temporary joins are all processed, block 1.3.5.2.5 executes to complete the analysis. It searches the internal record of the process elements and if any have not been cancelled (i.e. already used by the analysis process) then—

The entities in which the unprocessed process elements are table elements are identified For EACH If the entity is the same entity as was identified for the Where clause, the detail for additions to the Where clause are located using the unprocessed process element identifier 'Store Where' is used to add the details to the internally stored Where details. They will be used to create expanded Where clauses as—

AND Where Entity.Table Element [Comparator] Process Value

If any process elements are unprocessed and are NOT contained in the Entity identified for the Where clause, errors are reported BUT the generation continues.

List Information Function

Figure 17:
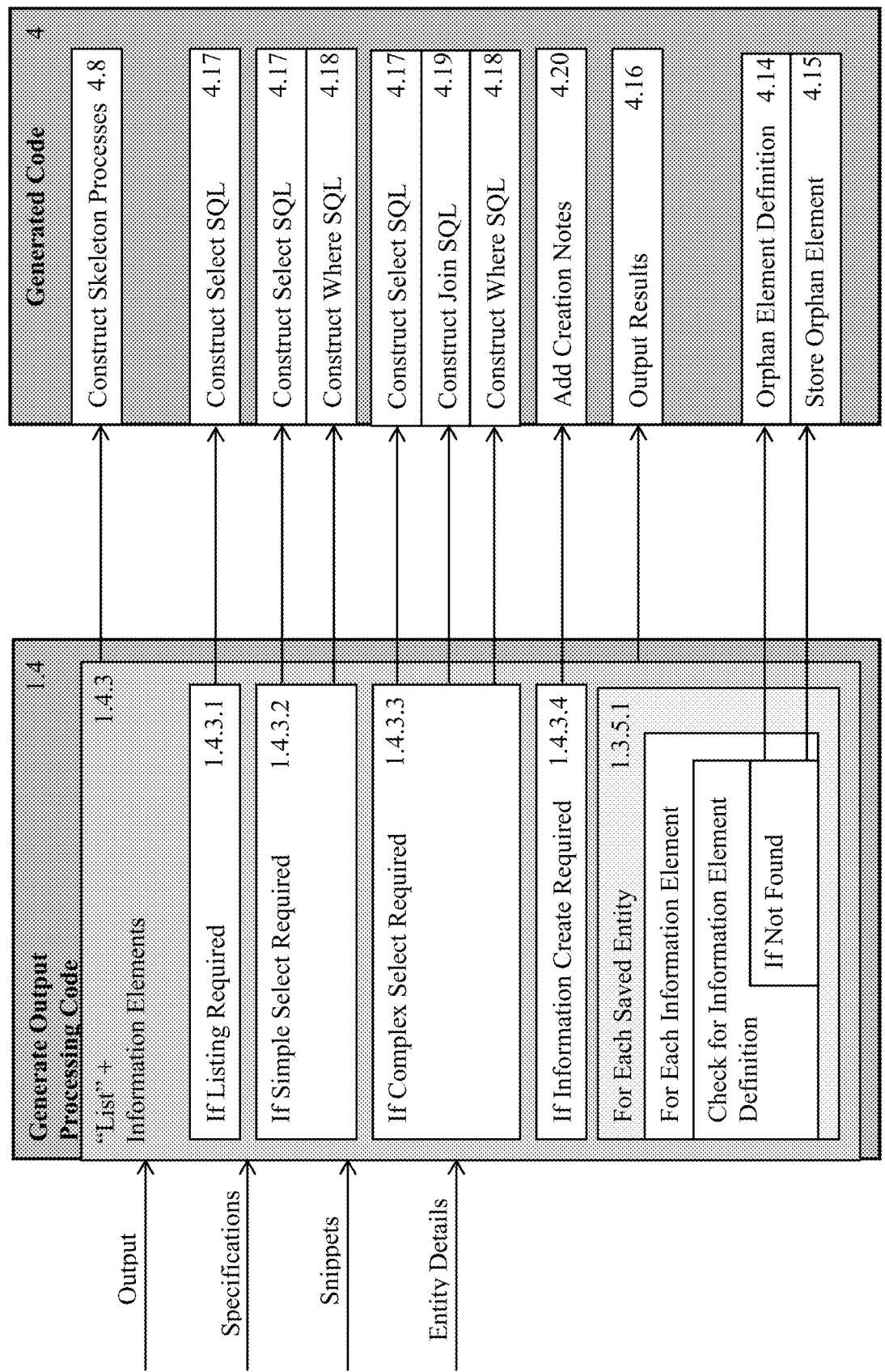

FIG. 17 shows an example for a List Information Elements 1.4.3 function. This function is the next logical process after an interrogation request input and will edit the required snippets so that the maintenance and interrogator program (11) can locate and store the information elements to be returned through the output.

Skeleton processes 4.8 are constructed to contain the detail processing in the maintenance and interrogator program (11) required to provide values in the information elements.

Snippets to format the information elements into the output are assembled 4.16 into the generated code (4).

The type of selection required for the List is determined:
If the list is a "Listing" then only Construct Select SQL 4.17 is required
If the analysis conducted on the process elements, information elements and table elements 1.3.5.2 did not locate any join details, then Construct Select SQL 4.17 and Construct Where SQL 4.18 are required
If the analysis conducted on the process elements, information elements and table elements 1.3.5.2 did locate join details, then Construct Select SQL 4.17, Construct Where SQL 4.18 and Construct Join SQL 4.19 are required
If any information element was located that was not included in the database table elements, notes are included in the generated code (4) to signify that this information is unobtainable requires creation 4.20.

Construct Select SQL 4.17 edits snippets to construct the generated code (4) required for the maintenance and interrogator program (11) to execute a SELECT SQL Statement that will include all table element content for all table elements detailed in the list information elements. This construction uses the internally stored source detail.

Construct Where SQL 4.18 edits snippets to construct the generated code (4) required for the maintenance and interrogator program (11) to control a SELECT SQL Statement so that it will be limited to selecting table element content detailed in the select, locating only the entity records containing table elements with content that evaluates as true when processed by the Where clause.

This construction uses the internally stored Where details located in 1.3.5.2 and is generated so that the statements follow the Construct Select SQL 4.17 generated code for this list.

Construct Join SQL 4.19 edits snippets to construct the generated code (4) required for the maintenance and interrogator program (11) to expand a SELECT SQL Statement so that the selected table element content can be derived from more than one entity and so that selection of the entities can be dependent upon conditions relating one entity to another being true when evaluated.

This construction uses the internally stored join details located in 1.3.5.2 and is generated so that the statements can be inserted between the Construct Select SQL 4.17 generated code and the Construct Where SQL 4.18 generated code for this list.

The information elements attached to the output are analysed. Any information element that has not already been defined in the maintenance and interrogator program (11) by the generated code (4) has orphan element 4.10 definitions constructed for array data 4.6.1, temporary data 4.6.2 and comparator data 4.6.3 so that the maintenance and interrogator program (11) can process the orphan element as if it were an information element.

Snippets are edited to get the maintenance and interrogator program (11) to move the required table elements into the information elements needed for the output. The output is transmitted back to the application program (5) as a collection of output records found by the maintenance and interrogator program (11) which can be retrieved one output record at a time.

Embodiments described herein automate creation of a single computer program that provides data maintenance and information retrieval that may provide at least one of the following advantages:

removes adverse consequences of increased complexity due to normalisation;
allows people without detailed SQL knowledge to specify the maintenance actions required for a database;
reduces the demand for trained SQL experts;
allows future changes in action requirements to be quarantined from the programs comprising an application except those programs requiring a change in database interaction;
allows future changes to a database to be spread through an application with minimal overhead;
allows expertise to be focused on the design of a database with minimal regard for the actual information requirement for which the database is being created;
allows for the database design to be driven by the data and the entities thus created to reflect the rules of normalisation;
allows changes to the content of entities to be made with minimum impact since only the computer program needs to be recreated to incorporate these changes (which may include adding a new entity, adding table elements to an entity, dividing an existing entity into several entities and combining several existing entities into one entity);
allows changes to the information requirements in the application to be specified and installed with minimum impact since only the computer program needs to be recreated to incorporate those changes (which may include adding data to an existing information, removing data from an existing information, dividing existing information into several informations and combining several existing informations into one information).

It will be understood that the computer program generator (1) can be implemented on any suitable computing device capable of communicating with the various databases. The computing device will include typical hardware such as a processor, memory, storage device, network device, and power supply. In one implementation, memory is a volatile memory unit or units. In another implementation, memory is a non-volatile memory unit or units. Memory can also be another form of computer-readable medium (e.g., a magnetic or optical disk). Memory may be non-transitory.

The storage device can be any suitable form of device capable of providing mass storage. In one implementation, the storage device can be, or contain, a computer-readable medium (e.g., a hard disk device, a flash memory or other similar solid-state memory device, or an array of devices, such as devices in a storage area network or other configurations.) A computer program product can be tangibly embodied in a data carrier. The computer program product also can contain instructions that, when executed, perform one or more methods (e.g., those described above.) The data carrier is a computer or machine-readable medium.

The processor can execute instructions within the computing device, including instructions stored in memory. The processor can be implemented as a chipset of chips that include separate and multiple analogue and digital processors. The processor can provide, for example, for coordination of the other components of device, e.g., control of user interfaces, applications run by device, and wireless communication by the computing device.

The various aspects discussed herein may be implemented via any appropriate number and/or type of computer platform, modules, processors, memory, etc. each of which may be embodied in hardware, software, firmware, middleware and the like.

Further, it will be understood that the term "processor" as used herein is to be construed broadly and include within its scope any device that can process the relevant data/messages and may include a microprocessor, microcontroller, programmable logic device or other computational device, a general-purpose computer, or a server computer.

It will also be understood that while the above described embodiments have been described in the context of an SQL database control language, it will be understood that other control languages may be utilised depending on the employed database management systems (e.g. SAP, Oracle, etc.).

While the invention has been described with reference to the present embodiment, it will be understood by those skilled in the art that alterations, changes and improvements may be made and equivalents may be substituted for the elements thereof and steps thereof without departing from the scope of the invention. In addition, many modifications may be made to adapt the invention to a particular situation or material to the teachings of the invention without departing from the central scope thereof. Such alterations, changes, modifications and improvements, though not expressly described above, are nevertheless intended and implied to be within the scope and spirit of the invention. Therefore, it is intended that the invention not be limited to the particular embodiment described herein and will include all embodiments falling within the scope of the independent claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:
1. A computer system for the automated construction of computer program code that is configured to interface with an application database responsive to requests from an application program, the computer system comprising:
  a code snippet database storing a set of predefined discrete program code snippets that each perform a part function or distinct function and that when combined are executable to perform one or more operations to interface with the application database and wherein at least one of the snippets stored in the code snippet database contains one or more placeholders for receiving specifications;
  an SQL generator configured to add new entity records to the application database based on requests received from the application program;
  wherein, responsive to receiving an application input to add a new entity record via the application program, the SQL generator is configured to perform the following steps:
  (i) examine the application input to identify process elements having process element values;
  (ii) determine whether each identified process element identifies a table element contained within the application database;
  (iii) for process elements that do identify a table element:
    a. allocate a unique primary key table element value where the process element identifies a table element in an entity record and wherein additional primary key table element values are not allocated if more than one process element identifies a table element in that entity record;
    b. construct an SQL statement to record one or more associated process element value(s) in corresponding table element(s) in the new entity record, the SQL statement constructed by selecting one or more predefined discrete program code snippets from the code snippet database that are relevant to the application input and wherein, where the selected predefined discrete program code snippet contains one or more placeholders, the SQL generator is configured to replace said placeholder(s) with one of the following: primary key table element value(s), process element name(s), process element value(s), table element name(s) or entity name(s);
  (iv) repeat sub steps iii(a) and iii(b) until all process element values in the identified process elements are recorded in table elements; and
  (v) generate the computer program code by combining the constructed SQL statements in a predefined order; and
  wherein, where new entity records contain the same primary key table element(s), the SQL generator is configured to assign the allocated value to each primary key table element value; and
  wherein, where step (iv) causes entity records to be created with different primary key table elements, the SQL generator is further configured to create new entity records so that one primary key table element value refers to the other primary key table element value.

2. The system in accordance with claim 1, wherein the SQL generator is further configured to combine additional snippets from the code snippet database with the SQL statements constructed in step (v) to generate the computer program code.

3. The system in accordance with claim 1, wherein the SQL generator is further configured to number the combined SQL statements and wherein the numbers are subsequently used for the automated construction of the computer program code.

4. The system in accordance with claim 1, wherein process elements that do not identify a table element are identified by the SQL generator as orphan elements.

5. The system in accordance with claim 1, wherein the SQL generator is further configured to alter values stored in existing entity records in the application database based on requests received from the application program;
  wherein, responsive to receiving an application input to alter one or more existing entity record values, the SQL generator is configured to perform the following steps:
  (vi) examine the application input to identify process elements having process element values;
  (vii) determine whether each identified process element identifies a table element contained within the application database;
  (viii) for process elements that identify a table element, locate existing entity record(s) to be updated using the identified table element(s);
  (ix) for each existing entity record to be updated, locate the primary key table elements that identify the corresponding existing entity record;
  (x) using the primary key table element value for the existing entity record, construct an SQL Statement configured to change the existing table element value(s) in the existing entity record, to the value in the corresponding process element(s), the SQL statement constructed by selecting one or more predefined discrete program code snippets from the code snippet database that are relevant to the application input and wherein, where the selected predefined discrete program code snippet contains one or more placeholders, the SQL generator is configured to replace said placeholder(s) with one of the following: primary key table element value(s), process element name(s), process element value(s), table element name(s) or entity name(s);
  (xi) repeat steps (ix) and (x) until all existing entity records located in step (viii) have been updated; and
  (xii) generate the computer program code by combining the constructed SQL statements in a predefined order.

6. The system in accordance with claim 5, wherein the SQL generator is further configured to combine additional snippets from the code snippet database with the SQL statements constructed in step (x) to generate the computer program code.

7. The system in accordance with claim 5, wherein the SQL generator is further configured to number the combined SQL statements and wherein the numbers are subsequently used for the automated construction of the computer program.

8. The system in accordance with claim 5, wherein following step (vi), process elements that do not identify a table element are identified by the SQL generator as orphan elements.

9. The system in accordance with claim 1 wherein the SQL generator is further configured to remove entity records, or table element values, from the application database based on requests received from the application program;
  wherein, responsive to receiving an application input to remove an entity record, or table element value, contained within the application database the SQL generator is configured to perform the following steps:
  (xiii) evaluate the application input to identify any process elements, each process element having a process element value;
  (xiv) determine whether each identified process element identifies a table element having a table element value;
  (xv) for process elements that do identify a table element, determine if the process element additionally identifies a primary key element having a primary key element value for an entity record;
    a. wherein for process elements that do not identify a primary key element for the entity record, construct an SQL statement configured to delete the corresponding table element value;
    b. wherein for process elements that do identify a primary key element for the entity record, construct an SQL Statement configured to delete the entity record having the same primary key element value as the corresponding process element value;
    c. wherein for process elements determined to be part of a collection of primary key table elements, construct an SQL statement configured to delete the entity record identified by the collection of primary key table elements;
  (xvi) generate the computer program code by combining the constructed SQL statements in a predefined order; and
  wherein the SQL statements in xv(a), xv(b) and xv(c) are each constructed by selecting one or more predefined discrete program code snippets from the code snippet database that are relevant to the application input and wherein, where the selected predefined discrete program code snippet contains a placeholder, the SQL generator is configured to replace said placeholder with one of the following specifications: primary key table element value(s), process element name(s), process element value(s), table element name(s) or entity name (s).

10. The system in accordance with claim 9, wherein the SQL generator is further configured to combine additional snippets from the code snippet database with the SQL statements constructed in step (xv) to generate the computer program code.

11. The system in accordance with claim 9, wherein the SQL generator is further configured to number the combined SQL statements and wherein the numbers are subsequently used for the automated construction of the computer program.

12. The system in accordance with claim 9, wherein following step (xiv), process elements that do not identify a table element are identified by the SQL generator as orphan elements.

13. The system in accordance with claim 1 wherein the SQL generator is further configured to provide information from the application database to the application program;
  wherein, responsive to receiving an application input requesting one or more table element values contained within the application database, to be provided according to a specified application output, the SQL generator is configured to perform the following steps:
  (xvii) evaluate the application output to identify any process elements;
  (xviii) determine whether each identified process element identifies a table element;
  (xix) for process element(s) that identify a table element, locate the entity record(s) containing the identified table element(s);
  (xx) for each located entity record(s), locate the process element value(s), or table element value(s), that identify the entity record(s) from which table element value(s) are to be provided;
  (xxi) using the value(s) located in step (xx), and the table element(s) located in step (xviii), construct SQL Statement(s) configured to extract the existing table element value(s) from the entity record(s), the SQL statement(s) constructed by selecting one or more predefined discrete program code snippets from the code snippet database that are relevant to the application output and wherein, where the selected predefined discrete program code snippet contains one or more placeholders, the SQL generator is configured to replace said placeholder(s) with one of the following: primary key table element value(s), process element name(s), process element value(s), table element name(s) or entity name(s);

(xxii) repeat steps (xx) and (xxi) until all table elements identified in step (xix) have been provided;

(xxiii) generate the computer program code from the constructed SQL statement(s) so that all constructed SQL statement(s) are combined to generate the program code.

14. The system in accordance with claim 13, wherein the SQL generator is further configured to combine additional snippets from the code snippet database with the SQL statements constructed in step (xxi) to generate the computer program code.

15. The system in accordance with claim 13, wherein the SQL generator is further configured to number the combined SQL statements and wherein the number is subsequently used for the automated construction of the computer program code.

16. The system in accordance with claim 13, wherein following step (xviii) process elements that do not identify a table element are provided in the application output with no value.

* * * * *